(12) United States Patent
Ebata

(10) Patent No.: US 7,617,399 B2
(45) Date of Patent: Nov. 10, 2009

(54) INFORMATION PROVIDING DEVICE, METHOD, PROGRAM AND RECORDING MEDIUM, AND USER AUTHENTICATION DEVICE, METHOD, PROGRAM AND RECORDING MEDIUM

(75) Inventor: Jun Ebata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 806 days.

(21) Appl. No.: 10/803,896

(22) Filed: Mar. 19, 2004

(65) Prior Publication Data

US 2004/0187009 A1 Sep. 23, 2004

(30) Foreign Application Priority Data

| Mar. 20, 2003 | (JP) | 2003-078993 |
| Feb. 9, 2004 | (JP) | 2004-032085 |

(51) Int. Cl.
*G06F 21/00* (2006.01)
(52) U.S. Cl. .................. 713/185; 713/186; 705/50; 705/51
(58) Field of Classification Search .............. 713/185, 713/186; 705/50, 51
See application file for complete search history.

(56) References Cited

U.S. PATENT DOCUMENTS

| 5,535,276 | A | * | 7/1996 | Ganesan ..................... 713/155 |
| 5,671,354 | A | * | 9/1997 | Ito et al. ...................... 726/3 |
| 5,819,235 | A | | 10/1998 | Tamai et al. |
| 6,035,282 | A | | 3/2000 | Tamai et al. |
| 6,317,834 | B1 | * | 11/2001 | Gennaro et al. ............. 713/186 |
| 6,715,082 | B1 | * | 3/2004 | Chang et al. ................... 726/8 |
| 2001/0052082 | A1 | * | 12/2001 | Kinoshita ................... 713/201 |
| 2002/0026575 | A1 | * | 2/2002 | Wheeler et al. ............. 713/156 |
| 2002/0095588 | A1 | * | 7/2002 | Shigematsu et al. ........ 713/186 |
| 2003/0012382 | A1 | | 1/2003 | Ferchichi et al. |
| 2003/0177392 | A1 | * | 9/2003 | Hiltgen ....................... 713/201 |
| 2003/1017739 | | * | 9/2003 | Hiltgen ....................... 713/201 |

FOREIGN PATENT DOCUMENTS

| EP | 1 043 648 | 10/2000 |
| EP | 1 197 827 A2 | 4/2002 |
| WO | WO 02/087272 | 10/2002 |

\* cited by examiner

*Primary Examiner*—Kimyen Vu
*Assistant Examiner*—Randal D Moran
(74) *Attorney, Agent, or Firm*—Oblon, Spivak, McClelland, Maier & Neustadt, L.L.P.

(57) ABSTRACT

In an information providing device and method, a plurality of information providers, including first and second information providers, are made to be associated with each other. The first information provider is caused to receive a first user information item, stored in a first information management unit, in response to a user information receiving request. The second information provider is caused to receive a second user information item, correlated with the first user information item and stored in a second information management unit, in response to a predetermined identification data. A unified information item is created by combining the first user information item and the second user information item based on the predetermined identification data is outputted.

31 Claims, 26 Drawing Sheets

FIG.2

| PROVIDER NAME | IMPLEMENT NAME | INITIALIZED INFO |
|---|---|---|
| AUTH. PROVIDER-A | ... | ... |
| AUTH. PROVIDER-B | ... | ... |
| P/W & F/P MERGE PROVIDER | ... | ... |
| P/W AUTH. PROVIDER | ... | ... |
| F/P AUTH. PROVIDER | ... | ... |

| MERGE PROVIDER NAME | PRIMARY PROVIDER NAME |
|---|---|
| P/W & F/P MERGE PROVIDER | P/W AUTH. PROVIDER |

| MERGE PROVIDER NAME | ADDITIONAL PROVIDER NAME |
|---|---|
| P/W & F/P MERGE PROVIDER | F/P AUTH. PROVIDER |

| MERGE PROVIDER NAME | PRIMARY ID | ADDIT. PROVIDER NAME | ADDIT. ID |
|---|---|---|---|
| P/W & F/P MERGE PROVIDER | 0001 | F/P AUTH. PROVIDER | 5551 |
| P/W & F/P MERGE PROVIDER | 0002 | F/P AUTH. PROVIDER | 5552 |
| P/W & F/P MERGE PROVIDER | 0003 | F/P AUTH. PROVIDER | 5553 |
| .. | .. | .. | .. |

| USER ID | PASSWORD | USER NAME | ... |
|---------|----------|-----------|-----|
| 0001 | ****** | XXXXXX | .. |
| 0002 | ****** | YYYYYYY | .. |
| 0003 | ****** | ZZZZZZZZ | .. |
| .. | .. | .. | .. |

| USER ID | F/P FEATURE DATA | 1821 |
|---|---|---|
| 5551 | \<F/P FEATURE-1\> | |
| 5552 | \<F/P FEATURE-2\> | |
| 5553 | \<F/P FEATURE-3\> | |
| .. | .. | |

FIG.11

| 502 |
|---|
| TICKET ID |
| TICKET TYPE |
| AUTH. PROVIDER NAME |
| TERM OF VALIDITY |
| PRIMARY AUTH. PROVIDER NAME |
| PRIMARY TICKET |
| ADDITIONAL TICKET LIST |
| MIC |

FIG.15

| AUTH. SERVICE NAME | "UauthService01.RRR" |
|---|---|
| TERM OF VALIDITY | 2003/02/07:18:31:12 |
| RANGE OF VALIDITY | "SERVER-A", "SERVER-B" |
| AUTH. PROVIDER | "P/W AUTH. PROVIDER", "F/P AUTH. PROVIDER" |
| USER ID | S-001-719964-772588612 |
| PERTINENT GROUP | Users, SscMembers, sgAdmin, fp_exclusive |
| MAIN ATTRIBUTES | post=manager, class=AC, mail=xxx.rrr.co.jp |

FIG.20

| EMPLOYEE ID | EMPLOYEE NAME | DEPT. | E-MAIL ADDR. | PHONE NUMBER | ... |
|---|---|---|---|---|---|
| 078109 | Yasuyuki Yamamoto | AA | y.yamamoto@*.co.jp | 03--** | ... |
| 074948 | Toshiharu Saitoh | AB | t.saitoh@*.co.jp | 03--** | ... |
| 043009 | Masahiro Takai | AC | m.takai@*.co.jp | 03--** | ... |
| .. | .. | .. | .. | .. | .. |

FIG.21

| EMPLOYEE ID | F/P FEATURE DATA | DATE OF REGIST | ... |
|---|---|---|---|
| 078109 | <F/P FEATURE-1> | 2003/06/30 | ... |
| 043009 | <F/P FEATURE-2> | 2003/08/01 | ... |
| .. | .. | .. | .. |

FIG.22

| EMPLOYEE ID | EMPLOYEE NAME | DEPT. | E-MAIL ADDR. | PHONE NUMBER | F/P FEATURE DATA | DATE OF REGIST. | ... |
|---|---|---|---|---|---|---|---|
| 078109 | Yasuyuki Yamamoto | AA | y.yamamoto@*.co.jp | 03--** | \<F/P FEATURE-1\> | 2003/06/30 | ... |
| 074948 | Toshiharu Saitoh | AB | t.saitoh@*.co.jp | 03--** | (NULL) | (NULL) | ... |
| 043009 | Masahiro Takai | AC | m.takai@*.co.jp | 03--** | \<F/P FEATURE-2\> | 2003/08/01 | ... |
| .. | .. | .. | .. | .. | .. | .. | .. |

1049

INFORMATION PROVIDING DEVICE, METHOD, PROGRAM AND RECORDING MEDIUM, AND USER AUTHENTICATION DEVICE, METHOD, PROGRAM AND RECORDING MEDIUM

BACKGROUND OF THE INVENTION

1. Field of the Invention

The present invention relates to an information providing device, method and computer program product which provide the user, in an integrated manner, with user information items which are managed by separate providers independently. Moreover, the present invention relates to a user authentication device, method and computer program product which carry out user authentication in association with a plurality of authentication units.

2. Description of the Related Art

Generally, the application programs of an information system are provided with the authentication function for the user, in order to prevent unauthorized access to the information system.

A typical example of the method of realizing the authentication function is a password system which requires the input of the user ID and the password at the time of starting of the application program.

The use of the application program is permitted only to the user who has inputted the user ID and the password correctly, and subsequently the user will be able to make use of various functions which are provided by the application program.

However, the danger of unauthorized access to the information system still remains if the user of the application program pertaining to all the services which are provided by the application program is permitted with the justification of the user being checked only at the time of starting of the application program.

For example, the user sometimes leaves his seat while the application program is in operation. In this case, there is the possibility that an illegal user makes use of the services of the application program in place of the original user.

A conceivable method to overcome the problem is that the authentication of the user is performed again when having access to the confidential information which is managed by the in-house information system. By this method, the security to the confidential information can be raised.

In this case, a more advanced level of security can be obtained if a first authentication engine (for example, the password authentication system) is used at the time of starting of the application program and a second authentication engine (for example, the fingerprint authentication system) is used at the time of having access to the confidential information, rather than using the same authentication engine for both the time of starting of the application program and the time of having access to the confidential information.

However, when using a plurality of authentication engines, it is meaningless that the authentication engines are provided for the user independently of each other. This is because there is no guarantee that the user approved in the first authentication engine and the user approved in the second authentication engine are the same person.

Therefore, the implementation of the functions of associating the plurality of authentication engines with each other is needed for the application program. However, the implementation of such functions for each application program will cause the man-hours of the development of each application program to increase unnecessarily.

By the way, the directory service is known as a system which manages the resources on the network and provides the retrieval unit of the network resources. The directory service has the close relation to the authentication function, and there is an authentication engine in which the functions of the directory service and the user authentication are implemented.

Therefore, it is very expedient if each directory service can also be linked with the user authentication when constructing the user authentication system which carries out the user authentication in association with the plurality of authentication functions.

SUMMARY OF THE INVENTION

An object of the present invention is to provide an improved apparatus and method in which the above-described problems are eliminated.

Another object of the present invention is to provide an information providing device, method and computer program product which can provide the user, in an integrated manner, with user information items which are managed by separate providers independently.

Another object of the present invention is to provide a user authentication device, method and computer program product which can carry out user authentication in association with a plurality of authentication functions while guaranteeing the identification of the user.

The above-mentioned objects of the present invention are achieved by an information providing device comprising: a provider association unit making a plurality of information providers, including first and second information providers, be associated with each other, the plurality of information providers providing respective user information items, the provider association unit comprising: a first unit causing the first information provider to receive a first user information item, stored in a first information management unit, in response to a user information receiving request; a second unit causing the second information provider to receive a second user information item, correlated with the first user information item and stored in a second information management unit, in response to a predetermined identification data; and a third unit outputting a unified information item which is created by combining the first user information item and the second user information item based on the predetermined identification data.

The above-mentioned objects of the present invention are achieved by an information providing method for use in an information providing device which makes a plurality of information providers, including first and second information providers, be associated with each other, the information providing method comprising: causing the first information provider to receive a first user information item, stored in a first information management unit, in response to a user information receiving request; causing the second information provider to receive a second user information item, correlated with the first user information item and stored in a second information management unit, in response to a predetermined identification data; and outputting a unified information item which is created by combining the first user information item and the second user information item based on the predetermined identification data.

The above-mentioned objects of the present invention are achieved by a computer program product for causing an information providing device which makes a plurality of information providers, including first and second information providers, be associated with each other, to perform: causing the first information provider to receive a first user information item, stored in a first information management unit, in response to a user information receiving request; causing the second information provider to receive a second user information item, correlated with the first user information item and stored in a second information management unit, in response to a predetermined identification data; and outputting a unified information item which is created by combining the first user information item and the second user information item based on the predetermined identification data.

The above-mentioned objects of the present invention are achieved by a user authentication device comprising: a provider association unit which makes a plurality of authentication providers, including first and second authentication providers, be associated with each other, the provider association unit comprising: a first unit causing the first authentication provider to perform, in response to a first authentication request, a first user authentication based on a first user identification data that is specified in the first authentication request; and a second unit causing the second authentication provider to perform, in response to a second authentication request related to a user approved by the first user authentication, a second user authentication based on a second user identification data that is correlated with the first user identification data.

The above-mentioned objects of the present invention are achieved by a user authentication method for use in a user authentication device which makes a plurality of authentication providers, including first and second authentication providers, be associated with each other, the user authentication method comprising: causing the first authentication provider to perform, in response to a first authentication request, a first user authentication based on a first user identification data that is specified in the first authentication request; and causing the second authentication provider to perform, in response to a second authentication request related to a user approved by the first user authentication, a second user authentication based on a second user identification data that is correlated with the first user identification data.

The above-mentioned objects of the present invention are achieved by a computer program product for causing a user authentication device which makes a plurality of authentication providers, including first and second authentication providers, be associated with each other, to perform: causing the first authentication provider to perform, in response to a first authentication request, a first user authentication based on a first user identification data that is specified in the first authentication request; and causing the second authentication provider to perform, in response to a second authentication request related to a user approved by the first user authentication, a second user authentication based on a second user identification data that is correlated with the first user identification data.

According to the information providing device, method and computer program product of the present invention, the user information items which are managed by the separate providers independently can be provided to the user in an integrated manner.

According to the user authentication device, method and computer program product of the present invention, the user authentication can be carried out in association with the plurality of authentication functions while the identification of the user is guaranteed.

BRIEF DESCRIPTION OF THE DRAWINGS

Other objects, features and advantages of the present invention will be apparent from the following detailed description when read in conjunction with the accompanying drawings.

FIG. 2 is a diagram for explaining the composition of an authentication provider management table which constitutes a merge information management database.

FIG. 3 is a diagram for explaining the composition of a merge provider management. table which constitutes the merge information management database.

FIG. 4 is a diagram for explaining the composition of an additional provider management table which constitutes the merge information management database.

FIG. 5 is a diagram for explaining the composition of an authentication provider merge table which constitutes the merge information management database.

FIG. 6 is a diagram for explaining the composition of a user management table in an external authentication server.

FIG. 7 is a diagram for explaining the composition of a fingerprint feature data management table which constitutes a fingerprint database.

FIG. 11 is a diagram for explaining a data structure of a merge ticket.

FIG. 15 is a diagram for explaining the composition of a merge authentication information data.

FIG. 20 is a diagram for explaining an example of a user list which is acquired from the external authentication server.

FIG. 21 is a diagram for explaining an example of the user list which is acquired from the fingerprint database.

FIG. 22 is a diagram for explaining an example of a merge user list.

DETAILED DESCRIPTION OF PREFERRED EMBODIMENTS

A description will now be provided of the preferred embodiments of the present invention with reference to the accompanying drawings.

Figure 1:
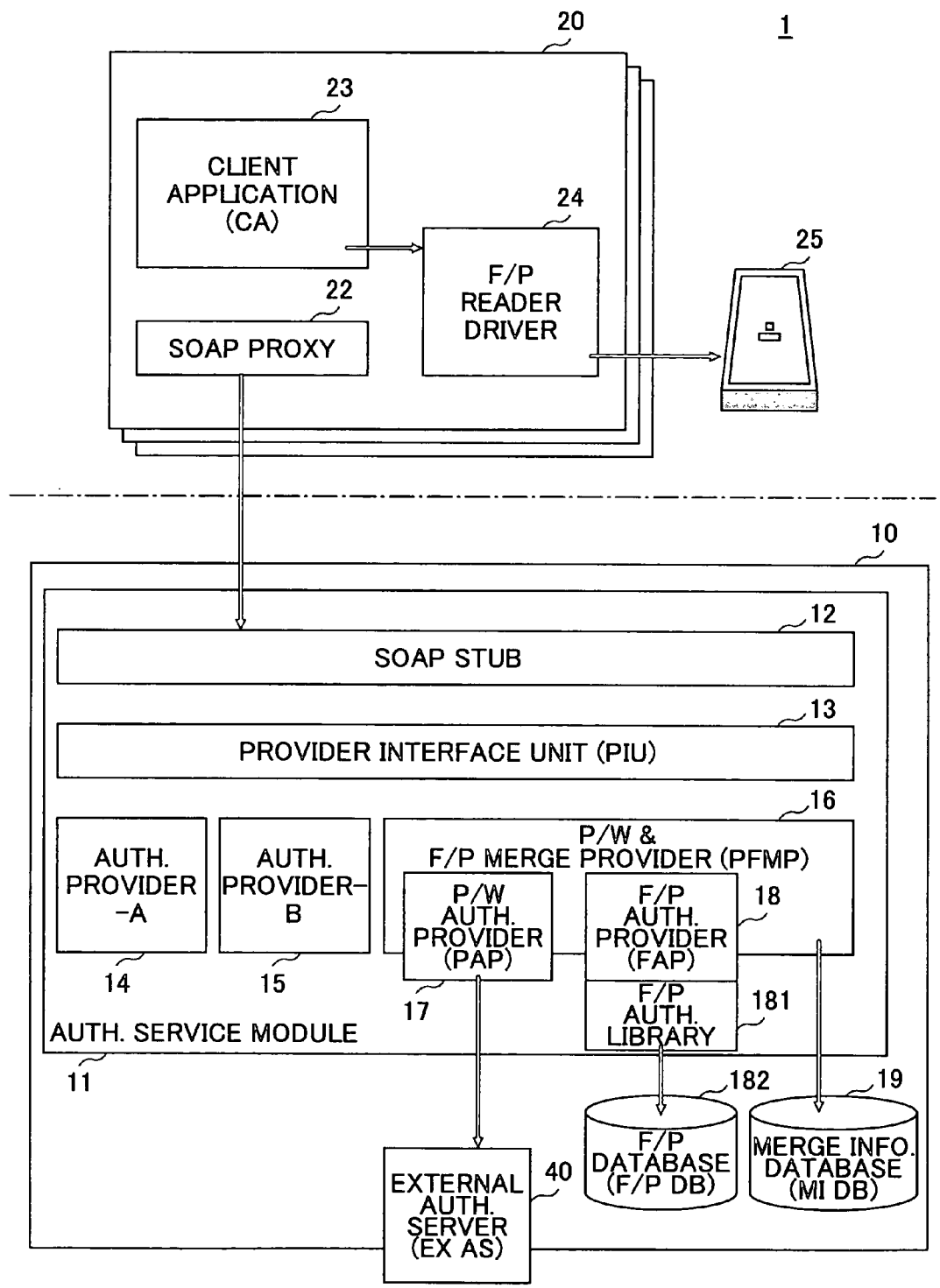
FIG. 1 is a block diagram of a first preferred embodiment of the user authentication system of the invention.

FIG. 1 is a block diagram of a first preferred embodiment of the user authentication system of the invention.

As shown in FIG. 1, the authentication system 1 in the present embodiment comprises the authentication server 10 and the terminal 20 which are connected through the network, such as the Internet and LAN.

The terminal 20 is the terminal, such as PC (personal computer) which is used by the user. The terminal 20 is provided with the SOAP proxy 22, the client application (CA) 23, and the fingerprint (F/P) reading device driver 24.

The SOAP proxy 22 is the module which realizes communication between the terminal 20 and the authentication server 10 by using the SOAP (simple object access protocol), and provides the client application 23 with the function of the authentication server 10 as a function interface transparent to the client application 23.

The fingerprint reading device driver 24 is the driver which provides the interface between the client application 23 and the fingerprint reading device 25 connected to the terminal 20.

The fingerprint reading device 25 is the device which reads the user's fingerprint. The client application 23 is the application program which is operated by the user directly. The client application 23 requires the inputting of authentication information of the user when the user's authentication is needed at the time of starting of the application program or the like.

If the authentication information is inputted by the user, the client application 23 will require the user's authentication of the authentication server 10 through the SOAP proxy 22. Although the kind of the client application 23 is not limited, the client application 23 which needs the user authentication at least at the time of using it is provided. In the present embodiment, the client application of the groupware which has the e-mail function like the usual one is assumed.

In addition, it is possible to assume the Web server as assignment of the terminal 20 (or the client of the authentication server 10). In this case, the Web server concerned is provided with the client application 23 installed as the Web application, and with the SOAP proxy 22, and the Web server carries out communication with the authentication server 10 by using the SOAP proxy 22.

The fingerprint reading device driver 24 is installed in the terminal which is used by the user as a Web client of the Web server concerned with the web browser, and it is connected with the fingerprint reading device 25. By using such composition, the user can use the function of the client application 23 through the Web page displayed on the web browser of the terminal.

If the user starts the client application 23, the client application 23 will require the inputting of the user ID (user-identification information) and the password.

If the user inputs the user ID and the password, the client application 23 will require the user's authentication from the authentication server 10 through the SOAP proxy 22.

Moreover, supposing the user performs high operation of security level in which fingerprint authentication is needed on the client application 23, the client application 23 will require the input of the fingerprint of the user.

If the user inputs the fingerprint by the fingerprint reading device 25, the client application 23 will require the user's authentication from the authentication server 10.

On the other hand, the authentication server 10 is a computer which provides the services of user authentication as Web services, and the authentication services module 11 is installed in the authentication server 10.

The authentication services module 11 is the software which causes the authentication server 10 to operate as the device providing the user authentication services. The authentication services module 11 in this embodiment is comprised of the SOAP stub 12, the provider interface unit (PIU) 13, the authentication provider-A 14, the authentication provider-B 15, the password and fingerprint merge provider (PFMP) 16, the password authentication provider (PAP) 17, the fingerprint authentication provider (FAP) 18, and the merge information management database (MI DB) 19.

The SOAP stub 12 is the module which realizes SOAP communication between the authentication server 10 and the terminal 20. More specifically, the SOAP stub 12 is the module which acts to publish the method interface of the provider interface unit 13 on the network as the SOAP interface. Namely, the SOAP stub 12 calls the method of the provider interface unit 13, which is demanded in the SOAP message concerned, based on the SOAP message (or SOAP request) received from the client PC 20, and transmits the return information on the method concerned to the client PC 20 as the SOAP response.

The provider interface unit 13 is the module which provides the common interface to the various authentication providers for the terminal 20. When the authentication request of the user is received from the terminal 20, the provider interface unit 13 calls the authentication provider concerned, which is specified in the authentication request.

The authentication provider-A 14, the authentication provider-B 15, the password and fingerprint merge provider 16, the password authentication provider 17 and the fingerprint authentication provider 18 are the modules which are called "authentication providers". In this embodiment, the authentication provider acts as the adapter or agent module which installs various authentication engines into the authentication services module 11.

In addition, the authentication engine means the system which actually carries out authentication processing such as matching of the password, matching of the fingerprint, etc. Namely, each authentication engine is provided with the original interface (protocol) respectively.

On the other hand, in order to provide the authentication function of each authentication engine for the terminal 20 as the Web service, it is necessary to follow the predetermined interface specified between the authentication server 10 and the provider interface unit 13.

The authentication provider acts to absorb the original protocols of the individual authentication engines, and provides the common interface for the provider interface unit 13.

Therefore, in order to install a new authentication engine into the authentication services module 11, it is necessary to install an additional authentication provider.

However, the authentication provider itself may have the function as the authentication engine. Specifically, the password authentication provider 17 is the authentication provider which provides the password authentication function of the external authentication server (EX AS) 40. In the external authentication server 40, the authentication engine for performing password authentication is installed as Web service.

Moreover, the fingerprint authentication provider 18 provides the fingerprint authentication function by using the fingerprint authentication library 181 and the fingerprint database (F/P DB) 182 as Web service. The fingerprint authentication library 181 includes a set of functions with which the function of performing fingerprint authentication is realized.

Moreover, the fingerprint DB 182 is a database with which the fingerprint feature data for every user etc. are registered. The authentication provider-A 14 and the authentication provider-B 15 are the instantiation for it being shown that it is possible to mount various authentication providers.

Although the password and fingerprint merge provider 16 are one of the authentication providers, he differs from other authentication providers in the point that it is not what functions as a direct intermediary to the authentication engine.

That is, the password and fingerprint merge provider 16 is the authentication provider which makes the password authentication provider 17 and the fingerprint authentication provider 18 be associated with each other.

In addition, the authentication provider which makes two or more authentication providers be associated with each other, similar to the password and fingerprint merge provider 16, is called "merge provider".

The authentication providers which are made to be associated with each other by the merge provider have not the equal relation, but the master-slave relation.

It is supposed that the authentication provider which becomes the "master" is called "primary provider", and the authentication provider which becomes the "slave" is called "additional provider".

Among the authentication providers which are made to be associated with each other, there is a single primary provider and the other authentication providers are all the additional providers.

The reason for the use of the expression of the master-slave relation is that the pre-requisite for receiving the approval of the additional provider is that it is already approved by the primary provider.

On the contrary, when receiving the approval of the primary provider, receiving the approval of the additional provider is not the pre-requisite. That is, the primary provider is the first authentication provider which is used in the authentication processing, and the additional provider is the secondary authentication provider which is used when the authentication of the primary provider is completed and a special, additional authentication is required.

According to the present invention, the term "association" means to link or combine two or more authentication providers with the master-slave relation being assigned thereto. In the present embodiment, the primary provider is embodied as the password authentication provider 17, and the fingerprint authentication provider 18 is embodied as the additional provider.

In addition, the combination of the authentication provider whom two or more merge providers as well as other authentication providers may be made to exist, and merge by the merge provider is free. For example, the new merge provider which merges the authentication provider-A 14 and the authentication provider-B 15 may be defined, and the password and fingerprint merge provider 16 may be made to merge the authentication provider-A 14 further.

The merge information management database (MI DB) 19 is the database with which the list of the authentication provider installed in the authentication server 10 and authentication providers' relation of merge are registered.

Next, a description will be given of the various tables which constitute the merge information management DB19.

FIG. 2 is the view showing the example of composition of the authentication provider management table which constitutes the merge information management DB.

The authentication provider management table 191 (call information-management unit) of FIG. 2 is the table which manages the list of the authentication provider registered into the authentication server 10, and the provider name, the mounting name, the initialization information on mounting dependence, etc. are registered for every authentication provider.

The provider name is the name for identifying the authentication provider uniquely. It is the information which is needed in order to call authentication providers, such as the file name (the EXE name, DLL name) in which for example, the authentication provider is installed, and the function name, or in order that the mounting name may start.

The initialization information on mounting dependence is the information which is needed at the time of the call of the authentication provider or starting.

Thus, let combination between the authentication providers merged by the provider interface unit 13, the authentication provider, and the merge provider and the merge provider concerned be the dynamic thing by managing each authentication provider's call information on the authentication provider management table 191.

That is, it is not necessary to carry out hard coding of the definitions (for example, the DLL name to load, the function name to call) depending on call information at the source code of the provider call part unit 13 or the merge provider.

Therefore, even when the new authentication provider is added, as long as the authentication provider concerned follows the predetermined interface, it is not necessary to correct the source code of the provider interface unit 13 or the merge provider.

In the present embodiment, since the authentication provider-A 14, the authentication provider-B 15, the password and fingerprint merge provider 16, the password authentication provider 17, and the fingerprint authentication provider 18 exist as mentioned above, each record is registered into the authentication provider management table 191.

On the authentication provider management table 191, when the provider interface unit 13 has the authentication request of the user from the terminal 20, it can know the procedure for calling the authentication provider.

Moreover, FIG. 3 is the view showing the example of composition of the merge provider management table which constitutes the merge information management DB.

The merge provider management table 192 (first authentication unit identification-information management unit) of FIG. 3 is the table which manages the authentication provider which is the merge provider among the authentication providers registered into the authentication provider management table 191, and the merge provider name, the primary provider name, etc. are registered for every merge provider.

The merge provider name is the merge provider's provider name. The primary provider name is the provider name of the authentication provider which is the primary provider in the merge provider concerned. On the merge provider management table 192, the merge provider is discriminable.

Moreover, the merge provider identifies the primary provider in self on the merge provider management table 192. Therefore, when newly defining the merge provider, or when changing the existing merge provider's primary provider into other authentication providers, it is not necessary to correct the merge provider's source code that what is necessary is just to change the merge provider management table 192.

In the present embodiment, since the password and fingerprint merge provider 16 are merge providers, the record corresponding to the password and fingerprint merge provider 16 is registered.

Moreover, since the primary provider of the password and fingerprint merge provider 16 is the password authentication provider 17 as mentioned above, the password authentication provider's 17 provider name is registered as the primary provider's of the password and fingerprint merge provider's 16 provider name.

Moreover, FIG. 4 is the view showing the example of composition of the additional provider management table which constitutes the merge information management DB.

The additional provider management table 193 (second authentication unit identification-information management unit) of FIG. 4 is the table for identifying the additional provider belonging to each merge provider, and has the data items, such as the merge provider name and the additional provider name.

The merge provider name is the merge provider's provider name. The additional provider name is the provider name which serves as the additional provider in the merge provider concerned.

In the present embodiment, since the additional provider of the password and fingerprint merge provider 16 is the fingerprint authentication provider 18, that is registered into the additional provider management table 193.

In addition, what is necessary is just to register into the additional provider management table 193 the new record which made the provider name of the password and fingerprint merge provider 16 the merge provider name, and made the provider name of the authentication provider which registers as an additional provider further the additional provider name, when adding the additional provider to the password and fingerprint merge provider 16 further.

Moreover, FIG. 5 is the view showing the example of composition of the authentication provider merge table which constitutes the merge information management DB.

The authentication provider merge table 194 (user ID correspondence management unit) of FIG. 5 is the table which matches the identification information of the user in the primary provider, and the user ID (user ID etc.) in the additional provider, and has the data items, such as the merge provider name, Primary ID, the additional provider name, and the additional ID.

The merge provider name is the merge provider's provider name. The primary ID is the user ID assigned to each user at the meaning in the authentication engine corresponding to the primary provider.

The additional provider name is the additional provider's provider name. The item of the additional provider name is established in order that with the addition ID it is possible to identify what is the additional provider, since it is possible to register two or more additional providers into one merge provider as mentioned above.

The additional ID is the user ID assigned to each user at the meaning in the authentication engine corresponding to the additional provider identified by the additional provider name.

Generally speaking, the coding scheme for identifying each user differs between the respective authentication engines. Therefore, in order to make each authentication engine be associated organically, the mechanism for determining the user ID in the other of the authentication engines once the user ID is identified by one of the authentication engines is needed. The authentication provider merge table 194 provides this mechanism.

In addition, a single authentication provider merge table 194 may be installed for the authentication services module 11, and it is possible to install it for the merge provider.

A description will be given of the authentication provider merge table 194. In the present embodiment, the password authentication provider 17 which is the primary provider of the password and fingerprint merge provider 16 is the authentication provider corresponding to the external authentication server 40, as mentioned above.

Since the external authentication server 40 is the server which installs the authentication engine which performs password authentication, it has the user management table shown in FIG. 6.

FIG. 6 is the view showing the example of composition of the user management table in the external authentication server.

The user management table 41 of FIG. 6 manages user information, such as user ID, the password, and the name, for every user. The user ID corresponds to the primary ID in the authentication provider merge table 194.

On the other hand, the fingerprint authentication provider 18 which is the additional provider of the password and fingerprint merge provider 16 is the authentication provider corresponding to the fingerprint authentication engine by the fingerprint authentication library 181 and the fingerprint DB 182 as mentioned above.

The fingerprint DB 182 has the fingerprint feature data management table shown in FIG. 7. FIG. 7 is a diagram for explaining the composition of the fingerprint feature data management table which constitutes the fingerprint DB.

The fingerprint feature data control table 1821 of FIG. 7 includes the user ID and the fingerprint feature data as the data items. The user ID is the identification information for identifying the fingerprint feature data uniquely.

The fingerprint feature data are the substance of the fingerprint feature data. The user ID corresponds to the addition ID in the merge table 194. Therefore, the authentication provider merge table 194 enables the external authentication server 40 to identify the fingerprint feature data of the user of 0001 with the user ID.

Moreover, by managing the correspondence of the user ID on the authentication provider merge table 194, it is possible to easily take appropriate measures even when the correspondence of the user ID has changed.

It is possible to generalize the merge provider's source code by managing the information required for operation of the merge provider with the authentication provider management table 191, the merge provider management table 192, the additional provider management table 193, and the authentication provider merge table 194. In other words, it is possible to realize the plurality of different merge providers from the single source code.

Figure 8:
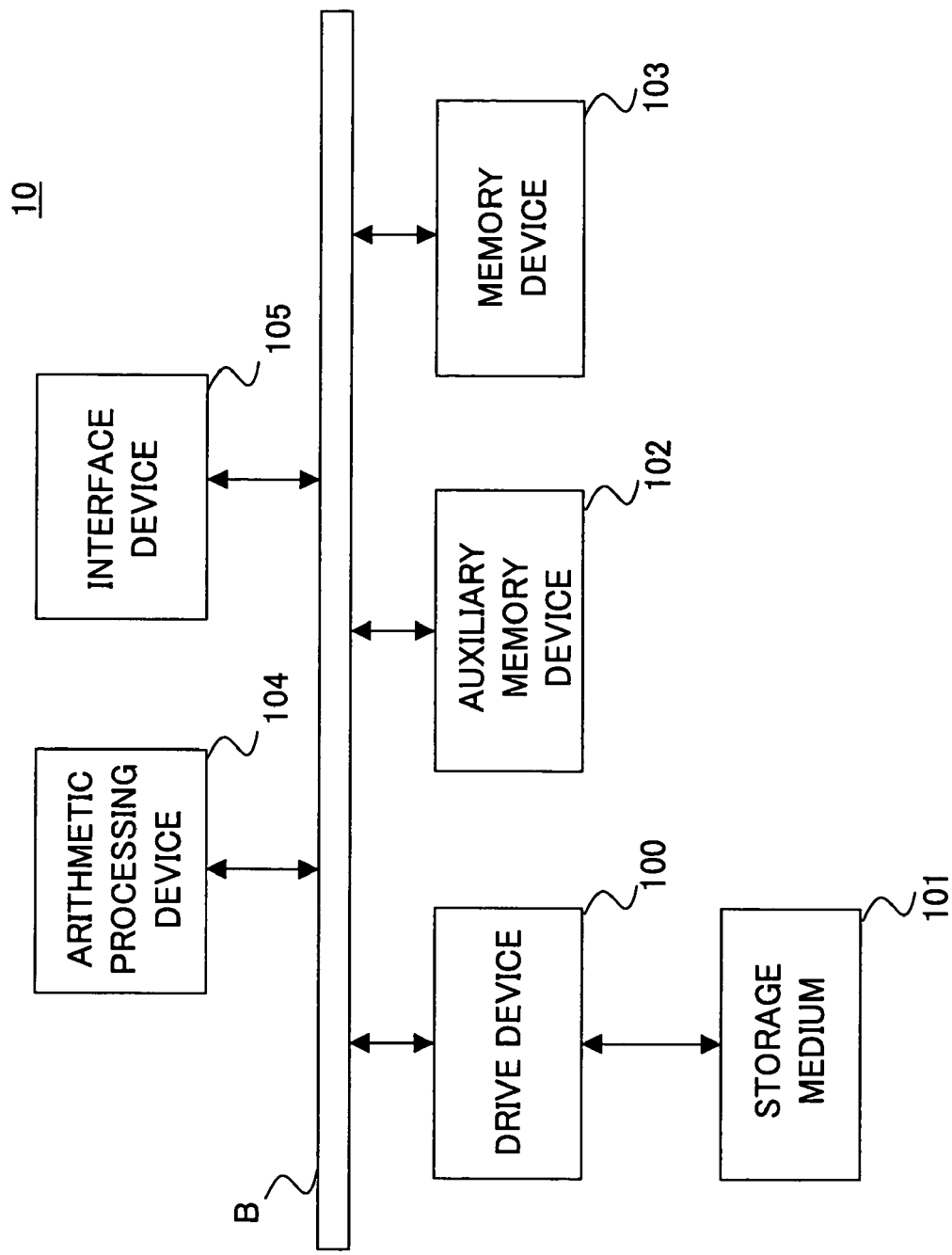
FIG. 8 is a block diagram of a hardware composition of an authentication server in the present embodiment.

FIG. 8 is a block diagram of a hardware composition of the authentication server in the present embodiment.

The authentication server 10 of FIG. 8 is constituted so that it may include the drive device 100, the auxiliary memory device 102, the memory device 103, the arithmetic processing unit 104, and the interface device 105 which are interconnected by the bus B respectively.

The user authentication program which realizes the authentication services module 11 in the authentication server 10 is provided by the storage medium 101, such as CD-ROM.

When the storage medium 101 in which the user authentication program is recorded is set in the drive device 100, the user authentication program will be installed in the auxiliary memory device 102 through the drive device 100 from the storage medium 101.

The auxiliary memory device 102 stores the required file, the required data, etc. while storing the installed user authentication program. For example, the auxiliary memory device 102 stores the various tables required for processing of the user authentication program described above.

The memory device 103 reads and stores the user authentication program from the auxiliary memory device 102 when the starting command of the user authentication program is received, such as the time of starting of the authentication server 10.

The arithmetic processing unit 104 performs the arithmetic processing function which is related to the authentication server 10 according to the user authentication program stored in the memory device 103.

The interface device 105 includes the modem, the router, etc., and it is used in order to connect the authentication server with the network, such as LAN or the Internet.

A description will be given of the processing of the authentication server 10 of FIG. 1.

In addition, in the following explanation, the authentication which used the additional provider for authentication using the primary provider with "primary authentication" is called "additional authentication".

Figure 9:
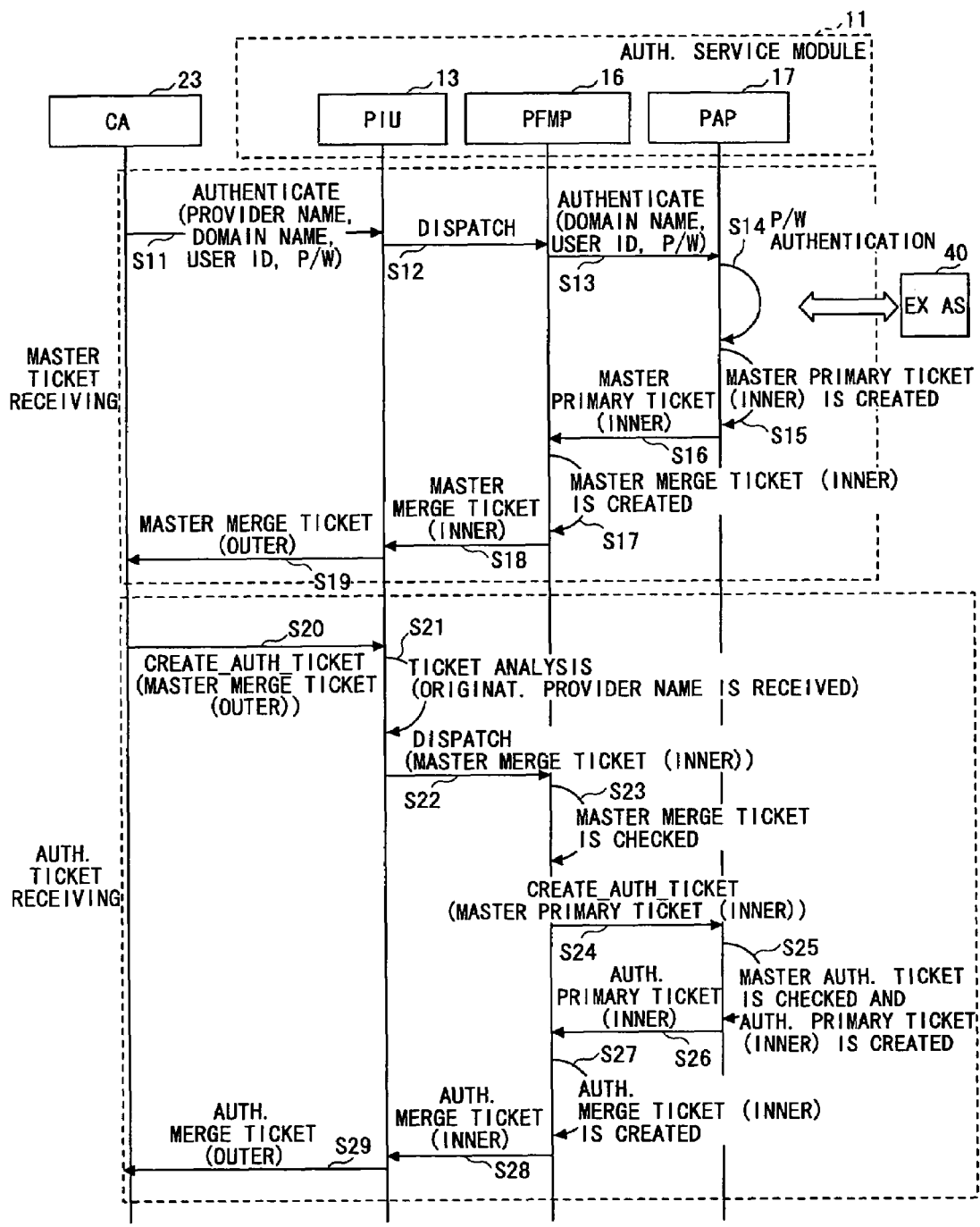
FIG. 9 is a sequence diagram for explaining processing of the authentication server in case of primary authentication.

FIG. 9 is a sequence diagram for explaining processing of the authentication server in case of primary authentication.

When the user starts the client application 23 in order to use the function of the client application 23, the client application 23 will require the inputting of the user ID and the password of the user.

If the user inputs the user ID and the password, the client application 23 will require the user's authentication of the authentication server 10 by calling the authentication function (Authenticate (provider name, domain name, user ID, password)) which is provided by the provider interface unit 13 through the RPC (remote procedure call) of the SOAP (S11).

In addition, the meaning of each argument of the authentication function is as follows.

The provider name is the provider name of the authentication provider which is used for authentication, and the provider name of the password and fingerprint merge provider 16 is specified in this case.

The domain name is the domain name of the domain where the terminal 20 belongs.

The specified values of other data items, such as the user ID and the password, may change depending on the authentication provider which is used for authentication. In the present embodiment, the primary provider of the password and fingerprint merge provider 16 is the password authentication provider 17, and the user ID and the password which are inputted by the user as the information required for the password authentication are specified.

Progressing to step S12 following step S11, the provider interface unit 13 by which the authentication function is called by the RPC (remote procedure call) acquires the information required in order to call the authentication provider specified by the provider name of the argument of the authentication function from the authentication provider management table 191, and calls the authentication provider concerned. The password and fingerprint merge provider 16 is called.

Progressing step S13 following step S12, the password and fingerprint merge provider 16 identifies the authentication provider registered as the primary provider thereof based on the merge provider management table 192, and calls the authentication function (Authenticate (domain name, user ID, password)) of the primary provider concerned. The authentication function of the password authentication provider 17 is called.

In addition, the value of each argument of the primary provider's authentication function is specified when the authentication function of the provider interface unit 13 is called, and those values are inherited.

Progressing to step S14 following step S13, the password authentication provider 17 performs password authentication using the external authentication server 40.

Progressing to step S15, if it is checked that the user is correct, the password authentication provider 17 creates the ticket.

A description will be given of the ticket. The ticket in the present embodiment means the electronic certificate proving the user concerned whom the authentication provider publishes to the user (client) who passed to authentication being approved.

In case the client which had the ticket published uses the predetermined servers, such as the document-management server, it can acquire the authority to use the server concerned, by showing the ticket.

Figure 10:
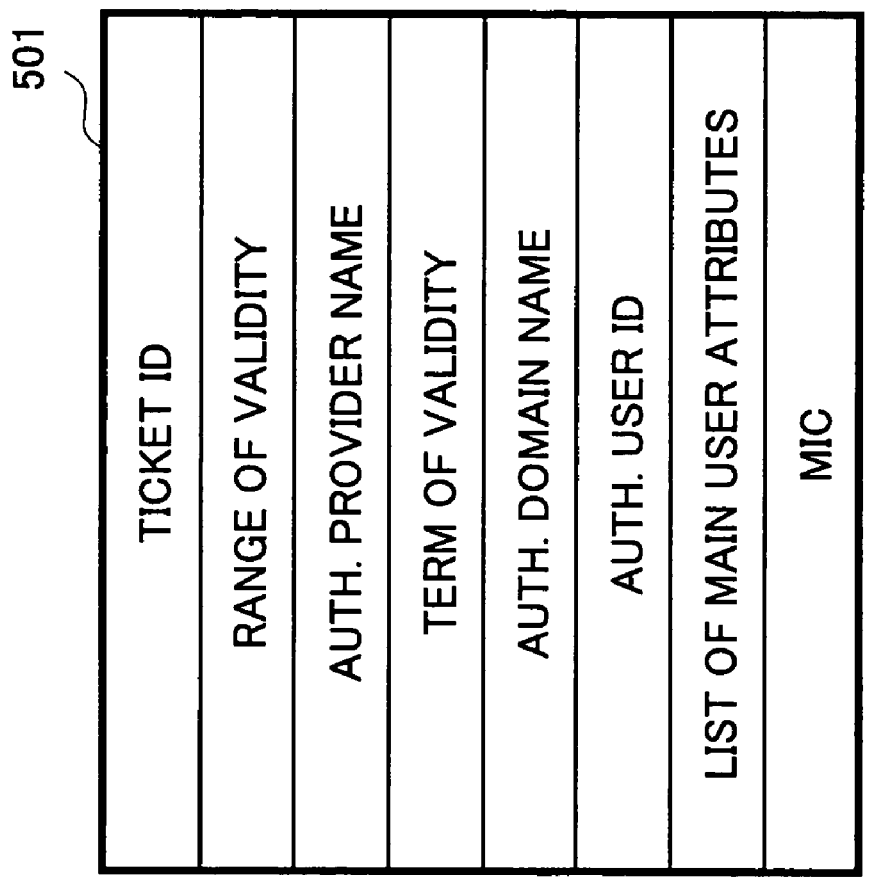
FIG. 10 is a diagram for explaining a data structure of a usual ticket.

FIG. 10 is a diagram for explaining a data structure of the usual ticket.

As shown in FIG. 10, the ticket 501 includes the ticket ID, the range of validity, the authentication provider name, the term of validity, the authentication domain name, the authentication user ID, the main user attributes, the MIC (media interface connector), etc.

The ticket ID is the code for identifying the published ticket uniquely. A description of the range of validity will be given later. The authentication provider name is the provider name of the authentication provider (where a ticket is published) which actually carries out authentication.

The term of validity is the term for which the ticket concerned is effective. The authentication domain name and authentication user ID are the domain name and user ID corresponding to the user who receives authentication.

The main user property list relate to various attributes (for example, the affiliation, the executive, etc.) of the user who receives authentication. The MIC is used as a code for ticket falsification check, and with the MIC, whether the ticket concerned is illegally altered or not can be checked.

In addition, there are the authentication ticket and the master ticket as ticket. The authentication ticket is the ticket which can be used only in the limited range. The limited range means that it can use only in the predetermined domain, or that it can use only by the predetermined system or the predetermined server.

For example, the authentication ticket which can be used only by the document-management system cannot be used by the external system.

Therefore, if the authentication ticket is stolen, the damage which the user receives is restricted only to the effective range of the authentication ticket stolen.

On the other hand, the master ticket is the allround ticket which can be used over all the ranges of the system corresponding to the ticket. When the issue of the authentication ticket is required, it is necessary to show the master ticket.

However, when the master ticket is stolen, because of the versatility, the damage may be extended to the entire range of the system corresponding to the ticket. Hence, it is advisable that the master ticket is used only upon the request of the authentication ticket, such as when the presentation of the master ticket is indispensable, and when the usual service is received, the authentication ticket is used. By making a proper use of the master ticket or the authentication ticket, it is possible to secure more advanced security.

The range of validity as the component of the ticket in the above-mentioned embodiment is provided for identifying this classification. That is, when the ticket concerned is the master ticket, it is recorded on the range of validity as the "master", and when it is the authentication ticket, the names (the domain name, server name, etc.) for identifying the range with the effective authentication ticket concerned are recorded.

In addition, in FIG. 9, step S19 starts the processing for publishing the master ticket from step S11, and step S29 requires it for the processing for showing the master ticket and obtaining the authentication ticket from step S20.

Moreover, from another viewpoint of the ticket, there are the inner ticket and the outer ticket.

The inner ticket is as the name the mnemonic name to the internal ticket, i.e., the ticket in the interior of the authentication server 10. On the other hand, the outer ticket is the mnemonic name to the ticket in the exterior of the authentication management server 10. That is, the difference between the inner ticket and the outer ticket is not the essential thing that the contents of the information currently recorded differ.

When the ticket is transmitted to the terminal 20 from the authentication server 10, the ticket is converted into the outer ticket from the inner ticket. On the other hand, when the authentication server 10 receives the outer ticket from the terminal 20, the ticket is converted into the inner ticket from the outer ticket.

Encryption is mentioned as an example of conversion. That is, the result of encryption of the inner ticket is the outer ticket.

Even when the metaphor ticket is stolen by enciphering the ticket, it can prevent that the contents are used unjustly.

Furthermore, in the present embodiment, the ticket is categorized into the primary ticket and the additional ticket according to the origin of issuing the ticket. The ticket with which the primary provider published the primary ticket is said, and, as for the additional ticket, the additional provider published.

In step S15, the password authentication provider 17 creates the inner type master ticket. Moreover, since the password authentication provider 17 is the primary provider, the created ticket is classified into the primary ticket.

Therefore, the ticket which the password authentication provider 17 created in step S15 is hereafter called "master primary ticket". The following values are recorded on each item of the master primary ticket:

the range of validity: "master";
the authentication provider name:"password authentication provider";
the term of validity: 2002/MM/DD;
the authentication domain name: <domain name specified to be argument of authentication function>;
the authentication user ID: <user ID specified to be argument of authentication function>.

Progressing to step S16 following step S15, the password authentication provider 17 outputs the created master primary ticket to the password and fingerprint merge provider 16 as a return value of the authentication function.

Progressing to step S17 following step S16, the password and fingerprint merge provider 16 create the merge ticket, and merges the master primary ticket at the merge ticket.

FIG. 11 is a diagram for explaining a data structure of the merge ticket.

As shown in FIG. 11, the merge ticket 502 is the ticket for merging two or more tickets, and includes the list of ticket classification, the authentication provider name, the term of validity, the primary provider name, the primary ticket, the additional tickets, the MIC, etc.

Ticket classification is the "range of validity" and this in the usual ticket 501 shown in FIG. 10.

The authentication provider name is the authentication provider name which published the merge ticket concerned. Therefore, the provider name of the password and fingerprint merge provider 16 is recorded on the authentication provider name.

The term of validity is the term of validity of the merge ticket concerned.

The primary provider name is the provider name of the primary provider who published the primary ticket merged by the merge ticket concerned. Therefore, the password authentication provider's 16 provider name is recorded.

The primary ticket itself to which the primary provider published the primary ticket is recorded. Therefore, the master primary ticket which the password authentication provider 16 published here is recorded.

The additional ticket with which the additional provider publishes the list of additional tickets is recorded. However, at this time, since authentication by the additional provider is not performed yet, the list of additional tickets is empty.

The MIC is the usual MIC which is the same as that in the ticket 501.

In addition, although there are distinction of the master ticket/authentication ticket and distinction of the inner ticket/outer ticket also about the merge ticket, the master type merge ticket is created at step S17 at the inner type.

Therefore, the ticket which the password and fingerprint merge provider 16 created in step S17 is called "master merge ticket" below.

Progressing to step S18 following step S17, the password and fingerprint merge provider 16 output the created master merge ticket to the provider interface unit 13.

Progressing to step S19 following step S18, the provider interface unit 13 transmits the master merge ticket which is converted from the inner type master merge ticket into the outer type (for example, encryption), and is converted into the outer type to the client application 23.

When step S19 is completed, it means that the client application 23 had acquired the master merge ticket.

Although it is also possible to use the alien system as it is using the master merge ticket since the master ticket is the allround ticket as mentioned above, it is not desirable on security to circulate the master ticket frequently on the network.

Therefore, the client application 23 requires generation of the effective authentication ticket of the authentication server 10 only from the system made applicable to use by calling the authentication ticket generation function (createAuthTicket (master merge ticket)) of the provider interface unit 13 by RPC of SOAP (S20).

In addition, the outer type master merge ticket acquired at step S19 is specified to be the argument of the authentication ticket generation function.

Progressing to step S21 following step S20, the provider interface unit 13 by which the authentication ticket generation function is called changes the outer type master merge ticket into the inner type (encryption is canceled).

Furthermore, the provider interface unit 13 distinguishes the authentication provider which has published the master merge ticket by checking the "authentication provider name" of the master merge ticket.

Progressing to step S22 following step S21, the provider interface unit 13 calls the authentication provider which is the source of the master merge ticket. Therefore, the password and fingerprint merge provider 16 are called.

Progressing to step S23 following step S22, the password and fingerprint merge provider 16 check the justification of the master merge ticket by the term of validity, MIC, etc.

Progressing to step S24 following step S23, the password and fingerprint merge provider 16 call the authentication ticket generation function (createAuthTicket (master primary ticket)) of the primary provider which has published the primary ticket merged by the master merge ticket. Therefore, the password authentication provider's 17 authentication ticket generation function is called.

In addition, the master primary ticket picked out from the master merge ticket is specified to be the argument of the password authentication provider's 17 authentication ticket generation function.

Progressing to step S25 following step S24, the password authentication provider 17 checks the justification of the master primary ticket specified to be the argument by the term of validity, MIC, etc., and creates the authentication ticket.

The data structure of the authentication ticket is as having explained in FIG. 10, and the value is recorded on each item like the master primary ticket.

However, unlike the master primary ticket, about the "range of validity", the server name or the domain name with the effective authentication ticket concerned etc. is recorded.

In addition, it is classified into the primary ticket according to the meaning that the password authentication provider 17 which is the primary provider creates also about the authentication ticket created. Therefore, the authentication ticket which the password authentication provider 17 created in step S25 is hereafter called "authentication primary ticket".

Progressing to step S26 following step S25, the password authentication provider 17 outputs the created authentication primary ticket to the password and fingerprint merge provider 16 as a return value of the authentication ticket generation function.

Progressing to step S27 following step S26, the password and fingerprint merge provider 16 create the merge ticket, and merges the authentication primary ticket at the merge ticket.

The merge ticket which the password and fingerprint merge provider 16 create is the authentication ticket with which the range of validity is limited.

Therefore, the merge ticket which the password and fingerprint merge provider 16 created in step S27 is called "authentication merge ticket" below.

Progressing to step S28 following step S27, the password and fingerprint merge provider 16 output the created authentication merge ticket to the provider interface unit 13.

Progressing to step S29 following step S28, the provider interface unit 13 transmits the authentication merge ticket which is. converted from the inner type authentication merge ticket into the outer type, and is converted into the outer type to the client application 23. It means that the client application 23 has acquired the authentication merge ticket subsequently to the master merge ticket.

Therefore, the client application 23 can use service of the server concerned by showing the authentication merge ticket to the effective server of the authentication merge ticket.

However, in the above embodiment, since only authentication by the primary provider (password authentication provider 17) is received, the authority granted to the client application 23 is restricted to the range which received authentication by the primary provider.

The "range" in "the range which received authentication" here is the different concept from the "range" in the "range of validity" which is the data item of the ticket 501.

The range in the "range of validity" is the range of the meaning which shows the object which can be used, for example, as the ticket concerned is effective at the server A and the server B.

On the other hand, the range in "the range which received authentication" shows that the ticket concerned receives authentication only in the primary provider and it is not approved by or not received authentication from the additional provider.

If it compares and says, the former will say the range in the superficial spread and the latter will say the range in the depth direction.

Hereafter, a description will be given of the processing which is performed, at the time of receiving the additional authentication, for guaranteeing more deeply that the user is approved.

Figure 12:
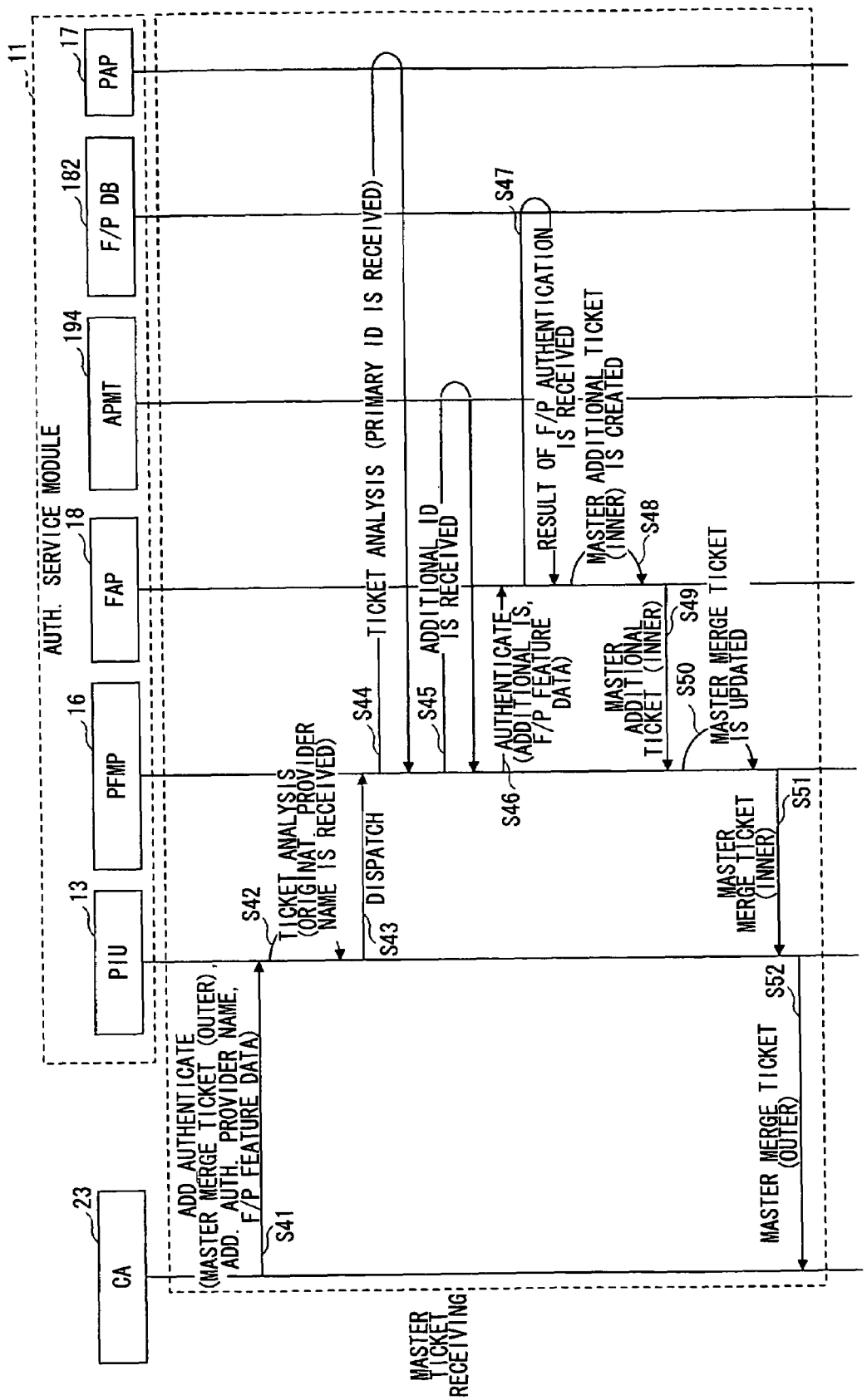
FIG. 12 is a sequence diagram for explaining processing of the authentication server in case of additional authentication.
Figure 13:
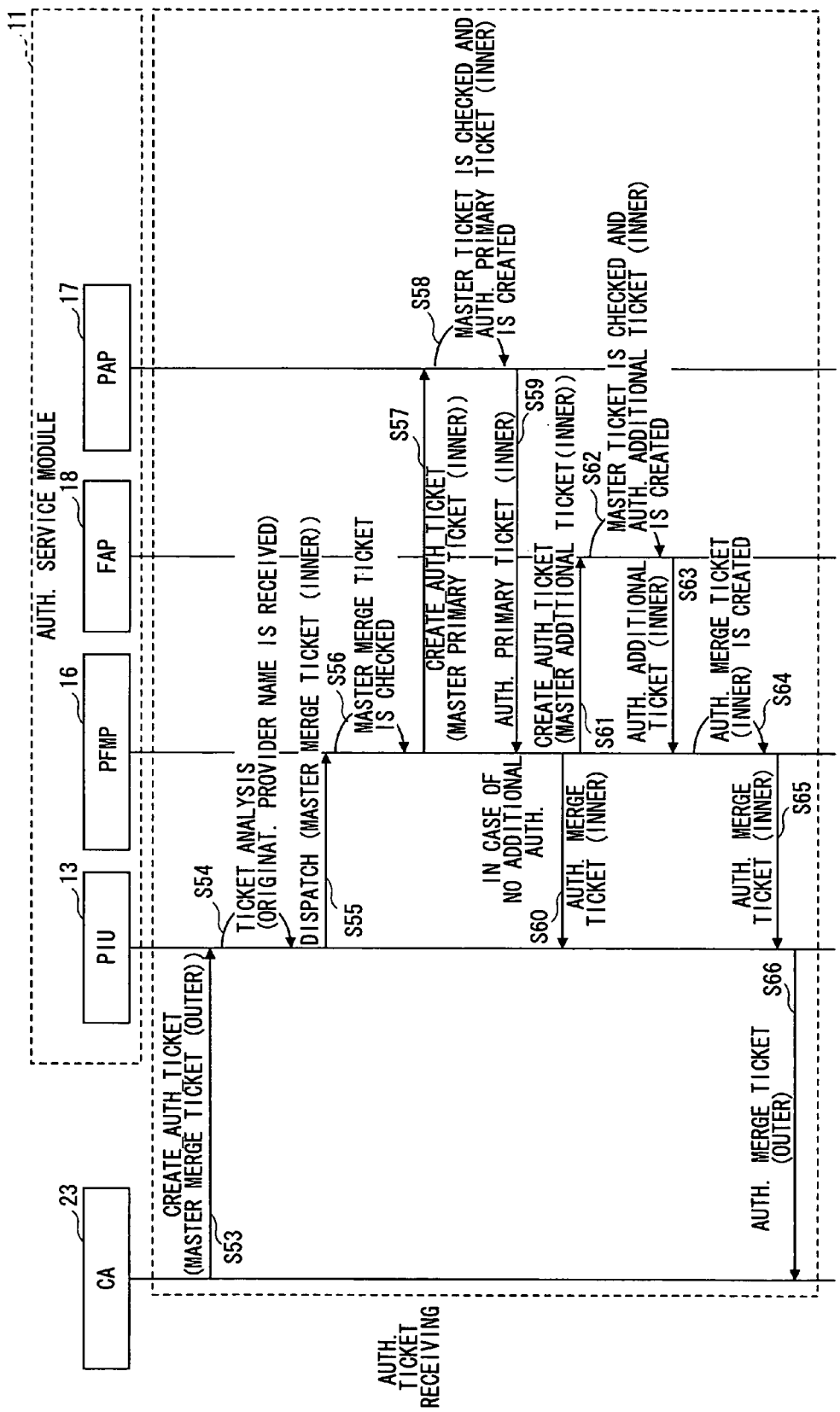
FIG. 13 is a sequence diagram for explaining processing of the authentication server in case of additional authentication.

FIG. 12 and FIG. 13 are the sequence diagrams for explaining processing of the authentication server in the case of additional authentication.

The user of the client application (CA) 23 assumes the case where it is going to use the service which cannot be used only by the password authentication provider 17 receiving authentication.

For example, when it is going to access the important confidential information, the case where it is going to perform recognition to the recognition request of the subordinate etc. is the good example.

When the user performs this processing request, the client application 23 in the present embodiment requires the input of the fingerprint of the user. However, the input of user ID is not needed here.

Generally, when the authentication is received, to input the information for determining the users, such as user ID, as the meaning and the information for guaranteeing that the user, such as the password and fingerprint, are correct is needed.

It is because it cannot judge whether the user is correct only in the input of user ID and cannot judge whose password or fingerprint it is only in the input of the password or the fingerprint.

Therefore, if it is usual for the user, the input of user ID should be required with the fingerprint.

However, although mentioned later for details, since the password and fingerprint merge provider 16 in the present embodiment determine the user ID (addition ID) in additional authentication of the user concerned based on the user ID (primary ID) already inputted on the occasion of primary authentication, he does not need to make demands on the user for the input of user ID in the case of additional authentication.

When the user makes the fingerprint reading device 25 read the fingerprint, the client application 23 is the additional authentication function (by calling addAuthenticate (the master merge ticket, the additional authentication provider name, the fingerprint feature data) by RPC of SOAP, additional authentication is required from the authentication server 10 (S41)) of the provider interface unit 13.

In addition, the meaning of the argument of the additional authentication function is that the master merge ticket with which the acquisition is already finished and in which the master primary ticket is merged is specified to be the master merge ticket.

The provider name of the additional provider which demands additional authentication is specified to be the additional authentication provider name. Therefore, the provider name of the fingerprint authentication provider 18 is specified.

The fingerprint feature data read by the fingerprint reading device 25 are specified to be the fingerprint feature data.

The provider interface unit 13 by which progressed to step S42 following step S41, and the additional authentication function is called distinguishes the authentication provider which has published the master merge ticket by checking the "authentication provider name" of the master merge ticket.

In addition, after this step, it omits about the outer form about the ticket, and the inner type distinction.

Progressing to step S43 following step S42, the provider interface unit 13 calls the authentication provider which is the source of the master merge ticket. Therefore, the password and fingerprint merge provider 16 are called.

Progressing to step S44 following step S43, the password and fingerprint merge provider 16.

When the master primary ticket is picked out from the master merge ticket and the acquisition of the user ID (primary ID) of the user who is the owner of the master primary ticket is required of the password authentication provider 17 which is the primary provider, the password authentication provider 17.

While checking the justification of the master primary ticket, the authentication user ID which took out authentication user ID from the master primary ticket, and is taken out to the password and fingerprint merge provider 16 is outputted as a primary ID.

Progressing to step S45 following step S44, the password and fingerprint merge provider 16 search the authentication provider merge table (APMT) 194 by using as the key the primary ID acquired from the password authentication provider 17, and the addition ID corresponding to Primary ID is acquired.

In addition, the addition ID acquired here corresponds to the user ID in the fingerprint feature data control table 1821 of the fingerprint DB 182.

Progressing to step S46 following step S45, the password and fingerprint merge provider 16 calls the authentication function (Authenticate (addition ID, fingerprint feature data)) of the additional provider determined by the additional authentication provider name which is specified in the argument of the additional authentication function. Therefore, the authentication function of fingerprint authentication provider 18 is called.

Progressing to step S47 following step S46, the fingerprint authentication provider 18 in which the authentication function is called reads out the fingerprint feature data specified to be the fingerprint feature data read out from the fingerprint DB 182, and the fingerprint feature data are taken out by the key in the addition ID (user ID) specified in the argument of the authentication function.

The fingerprint feature data specified in the argument of the authentication function are demanded by the user who has demanded additional authentication.

On the other hand, the fingerprint feature data taken out from the fingerprint DB 182 in step S47 correspond to the addition ID searched from the authentication provider merge table 194 by using as the key the primary ID which is the user ID of the user who received primary authentication.

Therefore, when the two fingerprint feature data are in agreement, it is guaranteed not only that the user who has demanded additional authentication is the user who is registered in the fingerprint DB 182, but also that the user who has received primary authentication and the user who has received additional authentication are the same person.

Therefore, the fingerprint authentication provider 18 creates the master ticket, which proves that the provider 18 has actually approved the correctness (S48).

In addition, the fingerprint authentication provider 18 is the additional provider, and it can be said that the ticket published by the fingerprint authentication provider 18 is the additional ticket. Therefore, the master ticket which is created in step S48 by the fingerprint authentication provider 18 is called "master addition ticket".

In addition, on the "authentication provider name" of the master addition ticket created, the authentication provider name of the fingerprint authentication provider 18 is recorded, and the user ID in the fingerprint DB 182 is recorded on the authentication user ID.

Progressing to step S49 following step S48, the fingerprint authentication provider 18 outputs the created master addition ticket to the password and fingerprint merge provider 16.

Progressing to step S50 following step S49, the password and fingerprint merge provider 16 merge the master addition ticket at the master merge ticket by which the master primary ticket is already merged.

Progressing to step S51 following step S50, the password and fingerprint merge provider 16 output the master merge ticket which merged the master addition ticket further to the provider interface unit 13.

Progressing to step S52 following step S51, the provider interface unit 13 transmits the master merge ticket to the client application 23.

It means that the client application 23 had received the still (additional authentication is received) more reliable master merge ticket by which the additional ticket is merged at this time.

Progressing to step S53 of FIG. 13 following step S52, the client application 23 acquiring the authentication ticket like the processing after step S20 of FIG. 9.

Therefore, step S59 is the same as that of processing from step S20 of FIG. 9 to step S26 from step S53. That is, based on the call of the authentication ticket generation function (createAuthTicket (master merge ticket)) of the provider interface unit 13 by the client application 23 (S53), the authentication primary ticket is created by the password authentication provider 17, and it is outputted to the password and fingerprint merge provider 16 (S54-S59).

The password and fingerprint merge provider 16 who received the authentication primary ticket judge whether the master addition ticket is merged by that additional authentication of the master merge ticket is carried out, i.e., the master merge ticket.

When the master addition ticket is not merged by the master merge ticket, the authentication merge ticket by which the authentication primary ticket is merged like the case of FIG. 9 is transmitted to the client application 23 (S60).

However, additional authentication is already received about the master merge ticket this time. Therefore, the password and fingerprint merge provider 16 call the authentication ticket generation function (createAuthTicket (master addition ticket)) of the additional provider who published the additional ticket merged by the master merge ticket in order to acquire the authentication ticket also from the additional provider (S61). Therefore, the fingerprint authentication provider's 18 authentication ticket generation function is called.

In addition, the master addition ticket picked out from the merge ticket is specified to be the argument of the fingerprint authentication provider's 18 authentication ticket generation function.

Progressing to step S62 following step S61, the fingerprint authentication provider 18 checks the justification of the master addition ticket specified to be the argument by the term of validity, MIC, etc., and it creates the authentication ticket (or the "authentication addition ticket").

Progressing to step S63 following step S62, the fingerprint authentication provider 18 outputs the created authentication addition ticket to the password and fingerprint merge provider 16 as a return value of the authentication ticket generation function.

Progressing to step S64 following step S63, the password and fingerprint merge provider 16 create the authentication merge ticket, and merges the authentication primary ticket acquired at step S59, and the authentication addition ticket acquired at step S63 at the authentication merge ticket.

Progressing to step S65 following step S64, the authentication merge ticket is transmitted to the client application 23 (S66). It means that the client application 23 had acquired the authentication merge ticket more reliable than the authentication merge ticket which came to hand in step S29 of FIG. 9 by which additional authentication is carried out.

Therefore, the client application 23 can use high service of security level further by showing the authentication merge ticket to the effective server of the authentication merge ticket.

In addition, the additional authentication function (addAuthenticate) of the provider interface unit 13 which the client application 23 calls in step S41 of FIG. 12 demands specification of the additional authentication provider name as an argument.

This shows that the additional provider who next makes additional authentication perform by client initiative is determined. That is, in the above embodiment, although even the fingerprint authentication provider 18 explained the example by which the chisel is defined as an additional provider of the password and fingerprint merge provider 16, if the new authentication provider's information is added to the additional provider management table 193 and the authentication provider merge table 194, it is also possible to define two or more additional providers as the password and fingerprint merge provider 16.

When there are two or more these additional providers, in the above-mentioned example, the turn of the additional provider who makes additional authentication perform will follow specification of the client which calls the additional authentication function.

However, it is possible to make the merge provider (the password and fingerprint merge provider 16) judge the turn of the additional provider who makes additional authentication perform.

For example, "turn" is added to the additional provider management table 193 as a new data item, and the turn of making additional authentication carrying out to "turn" item is registered.

When there is the request of additional authentication from the client application 23, and the merge provider checks "turn" item of the additional provider management table 193, the additional provider who calls to the degree is determined.

In this case, the additional provider name may be deleted from the argument of the additional authentication function, and it is possible to specify it as it is.

When it is made to specify it, it can check whether the phase by the side of the server and the client is in agreement by comparing the additional provider name specified to be the argument of the additional authentication function with the additional provider name which the merge provider judged.

Next, a description will be given as to how to use the ticket which is issued by the authentication server 10.

Figure 14:
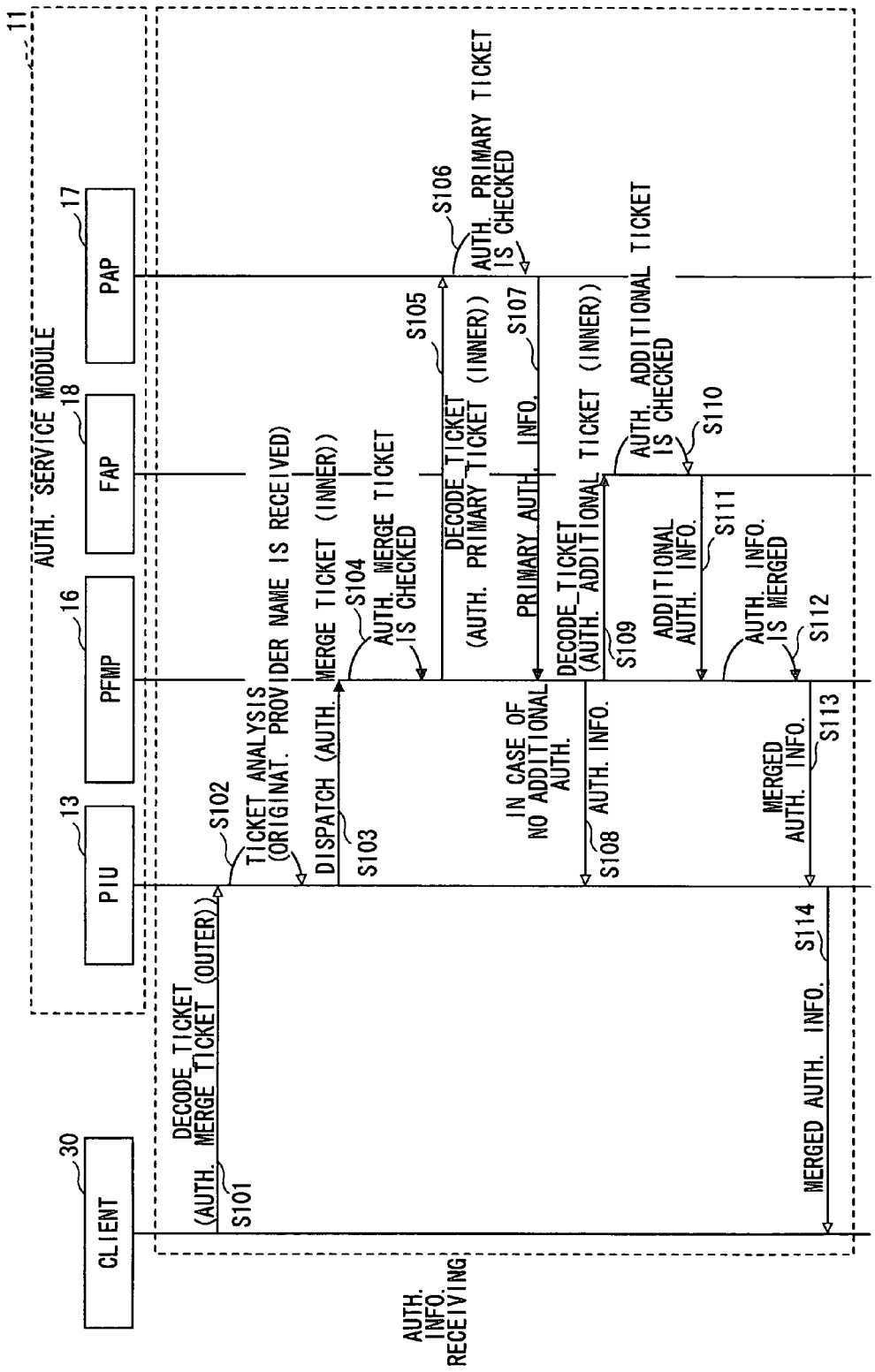
FIG. 14 is a sequence diagram for explaining a first method of using the ticket.

FIG. 14 is a sequence diagram for explaining the first method of using the ticket.

In FIG. 14, although the client application 23 is sufficient as the client 30, it is supposed that it is the server which provides the client application 23 with a predetermined service. And it is assumed that the client 30 receives presentation of the authentication merge ticket from the client application 23 together with the request to use the service.

In addition, although the client 30 is the server to the client application 23, it is the "client" to the authentication server 10 and the client 30 is expressed in FIG. 14.

The client 30 which has received presentation of the authentication merge ticket cannot interpret the contents of the ticket by itself. The authentication merge ticket from the client application 23 is enciphered (outer type), and the client 30 is not concerned about the structure of the ticket.

Therefore, the client 30 requires the decoding of the authentication merge ticket of the authentication server 10 in step S101 by calling the ticket decode function (decodeTicket (authentication merge ticket)) which is provided by the provider interface unit 13.

In addition, the authentication merge ticket received from the client application 23 is specified in the argument of the ticket decode function.

Progressing to step S102 following step S101, the provider interface unit 13 in which the ticket decode function is called distinguishes the authentication provider which has published the authentication merge ticket.

Progressing to step S103 following step S102, the provider interface unit 13 calls the password and fingerprint merge provider 16 which is the source of the authentication merge ticket.

Progressing to step S104 following step S103, the password and fingerprint merge provider 16 checks the justification of the authentication merge ticket by the term of validity, MIC, etc., and the ticket decode function (decodeTicket (authentication primary ticket)) of the password authentication provider 17 which has published the primary ticket merged by the authentication merge ticket is called (S105).

In addition, the authentication primary ticket picked out from the authentication merge ticket is specified in the argument of the password authentication provider's 17 ticket decode function.

Progressing to step S106 following step S105, the password authentication provider 17 interprets the contents of the authentication primary ticket while checking the justification of the authentication primary ticket specified to be the argument by the term of validity, MIC, etc., and the authentication information data ("primary authentication information data") with which the contents of the primary ticket form are converted to the text form that the client 30 may interpret are created.

Progressing to step S107 following step S106, the password authentication provider 17 outputs the created primary authentication information data to the password and fingerprint merge provider 16.

The password and fingerprint merge provider 16 which has received primary authentication information data determines whether the additional authentication of the authentication master merge ticket is carried out.

If additional authentication is not carried out, since authentication information is not included in the authentication master merge ticket any more, primary authentication information data are transmitted to the client 30 (S108).

On the other hand, when already receiving additional authentication about the authentication merge ticket, the password and fingerprint merge provider 16 call the fingerprint authentication provider's 18 ticket decode function (decodeTicket (authentication addition ticket)) in order to acquire authentication information data also from the fingerprint authentication provider 18 which has published the additional ticket merged by the authentication merge ticket (S109).

Progressing to step S110 following step S109, the fingerprint authentication provider 18 interprets the contents of the authentication addition ticket while checking the justification of the authentication addition ticket specified to be the argument by the term of validity, MIC, etc., and it creates authentication information data (the "additional authentication information data").

Progressing to step S111 following step S110, the fingerprint authentication provider 18 outputs the created additional authentication information data to the password and fingerprint merge provider 16.

Progressing to step S112 following step S111, the password and fingerprint merge provider 16 merge the additional authentication information data acquired from the password authentication provider 17, and the additional authentication information data acquired from the fingerprint authentication provider 18 (the merged authentication information data are hereafter called "merge authentication information data").

FIG. 15 is a diagram for explaining the composition of a merge authentication information data.

For example, the merge authentication information data include the authentication service name, the term of validity, the range of validity, the authentication provider, the user ID, the affiliation group, main attributes, etc., as shown in FIG. 15.

The authentication service name is the name which is given by the authentication services module 11. The term of validity is the term of validity currently recorded on the merge ticket.

The range of validity is the merged information which is created from the range of validity recorded on the primary ticket and the range of validity recorded on the additional ticket. That is, although "Server-A" and "Server-B" are separated by the comma, it means that the primary ticket is effective at the Server-A and the additional ticket is effective at the Server-B.

The authentication provider is enumeration of the name of the authentication provider which has published the ticket. Although the "password authentication provider" and the "fingerprint authentication provider" are separated by the comma, it means that the authentication is received from the password authentication provider 17 and the fingerprint authentication provider 18.

The user ID is the information for identifying uniquely the user who has received issue of the ticket. The affiliation group and main attributes merge the information extracted from the "main user attributes" of the primary ticket and the additional ticket.

Progressing to step S113 following step S112, the merge authentication information data are transmitted to the client 30.

Hence, the client 30 can recognize the service which can be provided to the user of the client application 23 by checking the acquired merge authentication information data (S114).

Figure 16:
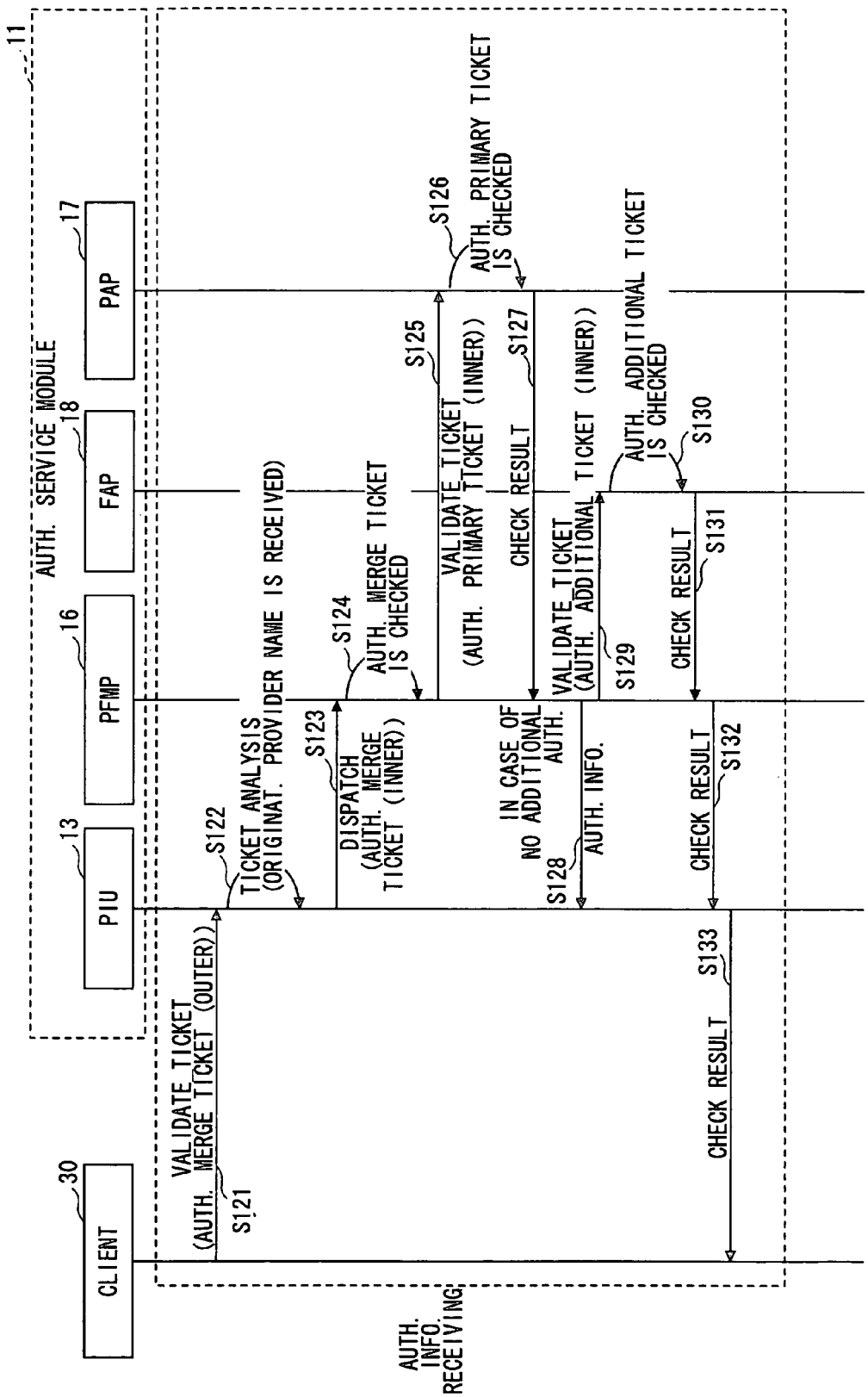
FIG. 16 is a sequence diagram for explaining a second method of using the ticket.

Furthermore, FIG. 16 is a sequence diagram for explaining the second method of using the ticket.

In FIG. 14, the example from which the client 30 receives the decode result of the ticket as authentication information data is explained. In FIG. 16, the example in which it is requested that the ticket is approved with the check of the justification of the ticket by which or to what extent it is approved to additional authentication up to primary authentication will be explained.

In addition, the assignment of the client 30 in FIG. 16 is the same as in FIG. 14.

In step S121, the client 30 requires the check of the justification of the authentication merge ticket etc. of the authentication server 10 by calling the ticket check function (ValidateTicket (authentication merge ticket)) which the provider interface unit 13 provides.

In addition, the authentication merge ticket shown from the client application 23 (transmission) is specified to be the argument of the ticket check function.

Progressing to step S122 following step S121, the provider interface unit 13 by which the ticket check function is called distinguishes the authentication provider which has published the authentication merge ticket.

Progressing to step S123 following step S122, the provider interface unit 13 calls the password and fingerprint merge provider 16 which is the source of the authentication merge ticket.

Progressing to step S124 following step S123, the password and fingerprint merge provider 16 check the justification of the authentication merge ticket by the term of validity, MIC, etc., and the ticket check function (ValidateTicket (authentication primary ticket)) of the password authentication provider 17 which has published the primary ticket merged by the authentication merge ticket is called (S125).

In addition, the authentication primary ticket picked out from the merge ticket is specified to be the argument of the password authentication provider's 17 ticket check function.

Progressing to step S126 following step S125, the password authentication provider 17 checks the justification of the authentication primary ticket specified to be the argument by the term of validity, MIC, etc., and the check result is outputted to the password and fingerprint merge provider 16 (S127).

In TRUE, the check result may be just and, in FALSE, the BOOL value of being inaccurate etc. is sufficient.

Then, the password and fingerprint merge provider 16 judge whether additional authentication of the authentication master merge ticket is carried out.

If additional authentication is not carried out, the check result is transmitted to the client 30 (S128).

Enumeration of the provider name of the authentication provider which has approved is sufficient as the check result, and the level may be shown that the primary provider is approved.

On the other hand, when already receiving additional authentication about the authentication ticket, in order that the password and fingerprint merge provider 16 may request the check of the ticket also to the fingerprint authentication provider 18 which has published the additional ticket merged by the authentication merge ticket, the fingerprint authentication provider's 18 ticket check function (ValidateTicket (authentication addition ticket)) is called (S129).

Progressing to step S130 following step S129, the fingerprint authentication provider 18 checks the justification of the authentication addition ticket specified to be the argument by the term of validity, MIC, etc., and the check result (for example, BOOL value) is outputted to the password and fingerprint merge provider 16 (S131).

Progressing to step S132 following step S131, the password and fingerprint merge provider 16 outputs a check result in which the check results acquired from both the password authentication provider 17 and the fingerprint authentication provider 18 are merged, to the provider interface unit 13.

For example, the check result in this step may be enumeration of the provider names of the authentication providers or a message indicating that the approval by the additional provider is received.

Progressing to step S133 following step S132, the provider interface unit 13 transmits the check result to the client 30. The client 30 receives the check result, and the client 30 can recognize, based on the check result, the service which can be provided to the user of the client application 23.

According to the authentication server 10 in the present embodiment, the merge provider derives the addition ID from the primary ID by using the authentication provider merge table 194, and performs the additional authentication based on the addition ID as mentioned above. The identity of the user who has received primary authentication and the user who will receive additional authentication can be guaranteed, and the authentication service in which the guarantee of justification of the user concerned is raised can be provided.

Moreover, the approved result is published as a ticket, and the ticket created contains the range of validity, the term of validity, and the code for ticket falsification check. Therefore, it is possible to provide an increased level of security.

That is, the system which is available to the user is restricted with the range of validity contained in the ticket, the period for which the use is permitted to the user is restricted with the term of validity contained in the ticket, and the justification of the ticket is guaranteed with the code for ticket falsification check contained in the ticket.

Moreover, the ticket which the primary provider or the additional provider has published is merged into the merge ticket, and the merge ticket is published by the merge provider. The device which has received the merge ticket does not need to involve with the correlation of each ticket, and it is possible to make the handling of the ticket easy.

In addition, in the present embodiment, although the example which the authentication services module 11 provides with the authentication function to the client application 23 arranged at the terminal 20 connected through the network is explained, the present invention is not limited to the client-server type system.

Figure 17:
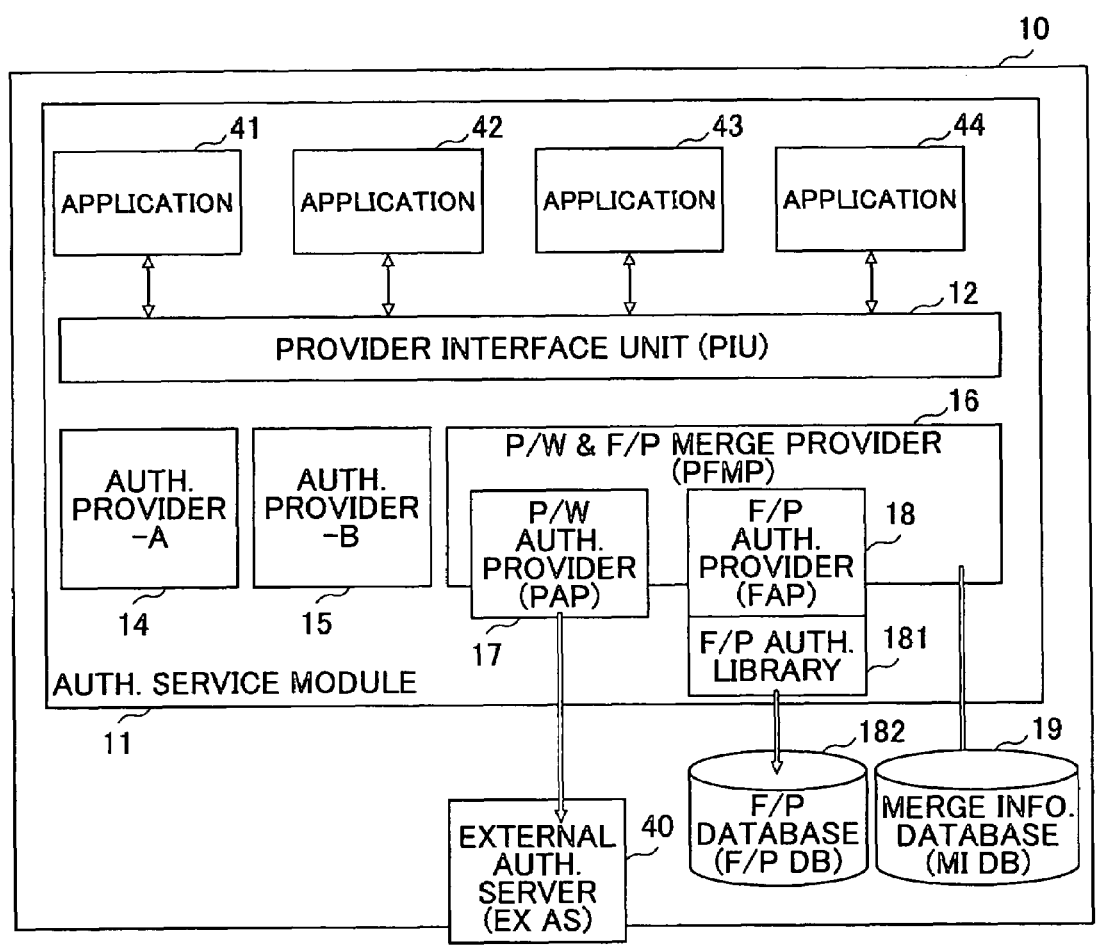
FIG. 17 is a block diagram of a functional composition of the authentication server which provides the internal application with the authentication function.

FIG. 17 is a block diagram of a functional composition of the authentication server which provides the internal application with the authentication function.

In FIG. 17, the elements which are essentially the same as corresponding elements in FIG. 1 are designated by the same reference numerals, and a description thereof will be omitted.

As shown in FIG. 17, the applications 41, 42, 43, and 44 are provided so that the function of the provider interface unit 13 may be called directly, not through the SOAP.

Thus, the authentication services module 11 can be used also from the internal applications installed within the authentication server 10.

By the way, the directory service in which the resources on the network are managed is known as a system which provides the retrieval unit for retrieving the network resources.

Although the resources mean the devices, the information about the user and the organization using the network, the server which can be used, the service, the printer, etc. the directory service is usually provided with the authentication function.

Next, a description will be given of a second preferred embodiment of the authentication system 1 in which the function of the directory service is installed additionally.

Figure 18:
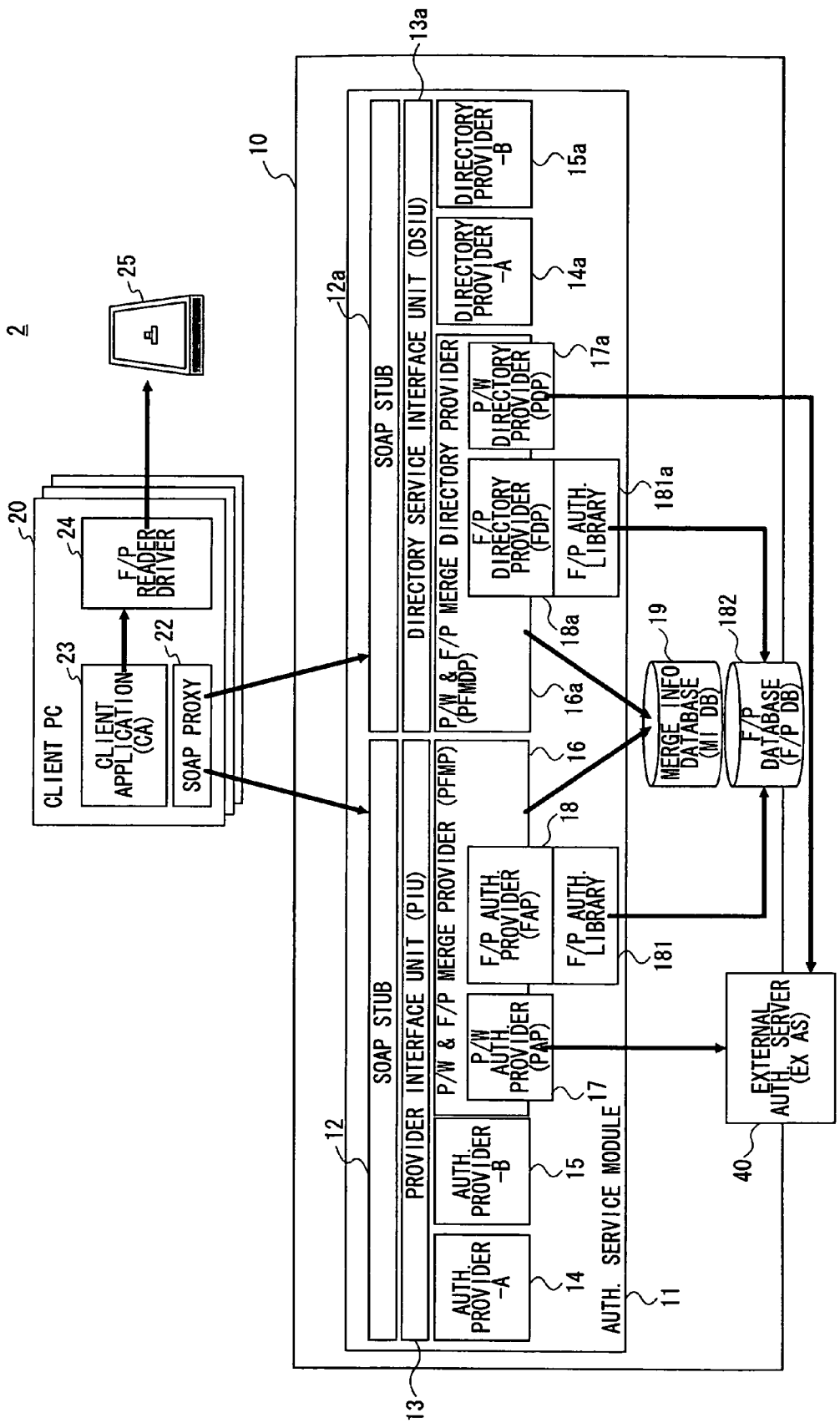
FIG. 18 is a block diagram of a second preferred embodiment of the user authentication system of the invention.

FIG. 18 is a block diagram of the second preferred embodiment of the user authentication system of the invention.

In FIG. 18, the elements which are essentially the same as corresponding elements in FIG. 1 are designated by the same reference numerals, and a description there of will be omitted.

In the authentication system 2 of FIG. 18, the SOAP stub 12*a*, the directory service interface unit 13*a*, the directory provider-A 14*a*, the directory provider-B 15*a*, the password and fingerprint merge directory provider 16*a*, the password directory provider 17*a*, the fingerprint directory provider 18*a*, etc. are further provided in the authentication services module 11 of the authentication server 10.

The SOAP stub 12*a* is the module which acts to publish the method interface of the directory service interface unit 13*a* on the network as the SOAP interface.

The directory service interface unit 13*a* is the module equivalent to the provider interface unit 13 in the authentication function, and is the module which provides the common method interface to the function as a directory service in various authentication providers.

The various directory providers, such as the directory provider-A 14*a*, the directory provider-B 15*a*, the password directory provider 17*a*, and the fingerprint directory provider 18*a*, are the modules which provide the various attribute information of the user (such as the information about the affiliation or the executive, in addition to the information for accessing the users concerned, such as the extension number and the mail address), which will be called "user information".

For example, the password directory provider 17*a* is the module which provides the user information managed in the external authentication server 40.

Moreover, the fingerprint directory provider 18*a* is the module which provides the user information managed in the fingerprint DB 182.

Moreover, the password and fingerprint merge directory provider 16*a* is the merge provider which makes the password directory provider 17*a* (primary provider) and the fingerprint directory provider 18*a* (additional provider) be associated. That is, among the directory providers, the concept of the merge, which is the same as that among the authentication providers in the first preferred embodiment, is applicable.

The information of these directory providers and the merge information of these directory providers are managed by using the table in the format that is the same as that in the first preferred embodiment, which is stored in the merge information management DB19.

In the second preferred embodiment, the fingerprint directory provider 18*a* is provided as the additional provider and the password directory provider 17*a* is as the primary provider, which are pre-defined in the merge information management DB 19.

Next, a description will be given of the processing of the authentication server 10 of FIG. 18.

Figure 19:
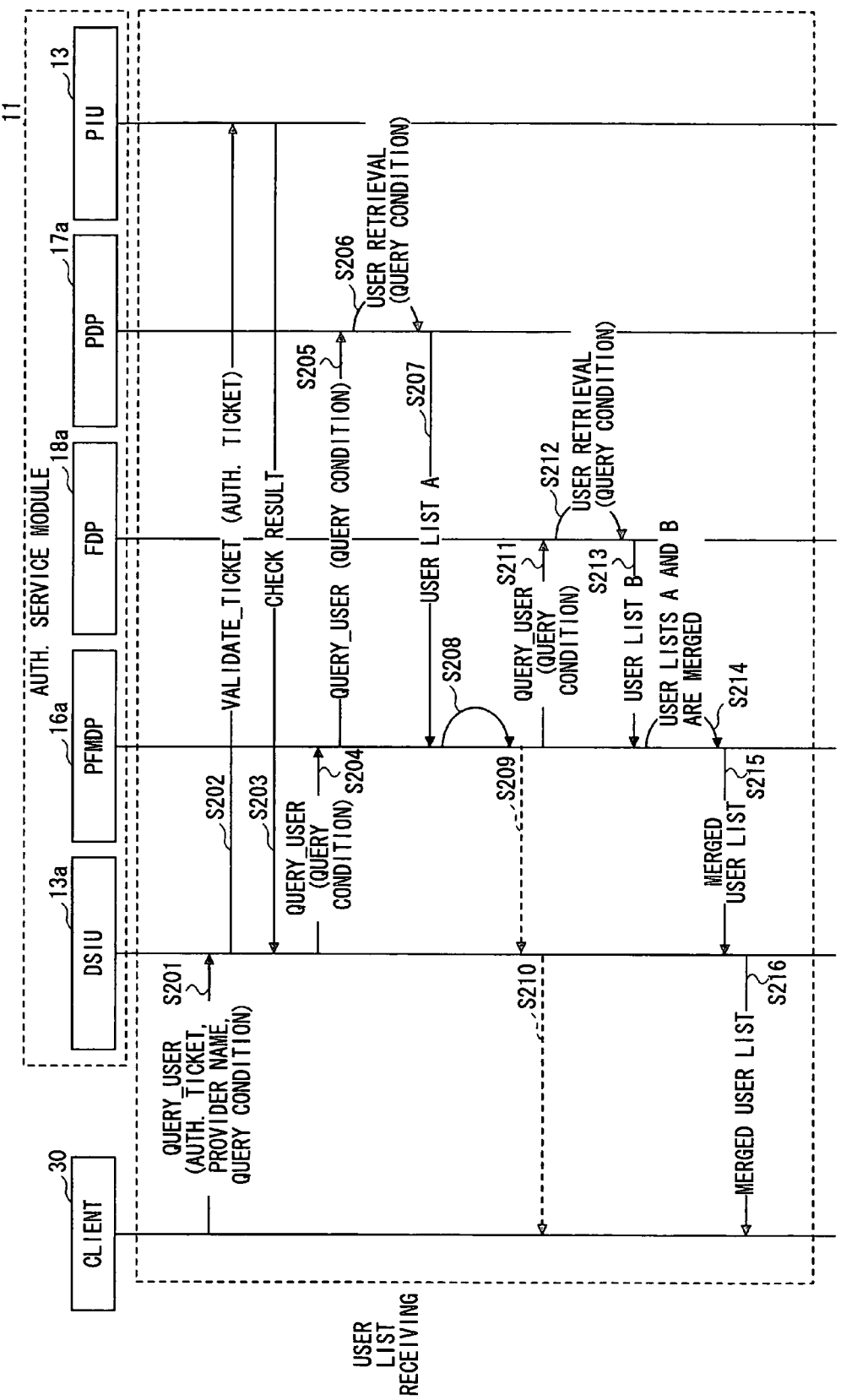
FIG. 19 is a sequence diagram for explaining processing of the authentication server when the provision of user information is requested.

FIG. 19 is a sequence diagram for explaining processing of the authentication server in the present embodiment at the time of requesting the receiving of the user information.

In the example of FIG. 19, it is assumed that the request of receiving the user information is sent from the client 30. In addition, it is assumed that the client 30 already holds the authentication merge ticket which is published through the processing of FIG. 9, FIG. 12 or FIG. 13.

It should be noted that the processing in FIG. 19 is essentially different from the processing in FIG. 14 in which the user information about the user (the owner of the ticket) contained in the ticket is acquired when the client 30 requests the decoding of the ticket concerned to the authentication server 10.

That is, the processing in FIG. 19 does not acquire the information about the owner of the ticket, and it is the processing for referring to the user information about other users using the ticket.

Therefore, the processing in FIG. 19 may be performed only to the user to whom the reference of the user information about other users is permitted.

In step S201, the client 30 requests the receiving of the list of user information ("the user list") of the authentication server 10 by calling the user list acquisition function (queryUser) which is provided by the directory service interface unit 13a.

In addition, the authentication merge ticket, the candidate provider name, acquisition conditions, etc. are specified to be the arguments of the user list acquisition function.

The candidate provider is the provider name (here the password and fingerprint merge directory provider 16a) of the directory provider of the request place of receiving the user information.

Moreover, the acquisition conditions are the conditions (the retrieval conditions) for narrowing down the user information related to the retrieval.

Progressing to step S202 following step S201, the directory service interface unit 13a in which the user list acquisition function is called calls the ticket check function (ValidateTicket (authentication merge ticket)) of the provider interface unit 13 in order to check the justification of the authentication merge ticket specified to be the argument of the function.

By calling the ticket check function, the processing of FIG. 16 is performed, the justification of the authentication merge ticket and the reference authority of the user list to the owner of the authentication merge ticket concerned etc. are judged, and the judgment result is' returned to the directory service interface unit 13a from the provider interface unit 13 (S203).

When the justification of the ticket is checked, the directory service interface unit 13a requests receiving of the user list from the password and fingerprint merge directory provider 16a by progressing to step S204 by calling the user list acquisition function (queryUser) of the password and fingerprint merge directory provider 16a.

Progressing to step S205 following step S204, the password and fingerprint merge directory provider 16a requests receiving of the user list from the password directory provider 17a by calling the user list acquisition function (queryUser) of the password directory provider 17a which is the primary provider.

In addition, the password and fingerprint merge directory provider 16a makes the determination about the procedure for calling the password directory provider 17a with reference to the merge provider management table 192 and the authentication provider management table 191 and based on the definition that the password directory provider 17a is the primary provider.

Progressing to step S206 following step S205, the password directory provider 17a searches the user information which is specified in the argument of the user list acquisition function and which carries out matching of the acquisition condition from the external authentication server 40, and outputs the list of the searched user information (user list) to the password and fingerprint merge directory provider 16a (S207).

FIG. 20 is a diagram for explaining an example of the user list which is acquired from the external authentication server.

As shown in FIG. 20, the employee ID, the employee name, the affiliation, the e-mail address, the phone number, etc. are contained in the searched user list for every user.

Progressing to step S208 following step S207, the password and fingerprint merge directory provider 16a determines whether the retrieval to the additional provider is demanded with reference to the acquisition conditions.

For example, when the retrieval to the additional provider is not needed (or when only the primary provider is the candidate for the retrieval) in the acquisition conditions, the password and fingerprint merge directory provider 16a outputs only the user list acquired from the primary provider (the password directory provider 17a) to the directory service interface unit 13a (S209).

The user list concerned is transmitted from the directory service interface unit 13a to the client 30 (S210).

On the other hand, when the retrieval to the additional provider is needed in the acquisition conditions, the password and fingerprint merge directory provider 16a requests receiving of the user list from the fingerprint directory provider 18a by calling the user list acquisition function (queryUser) of the fingerprint directory provider 18a which is the additional provider (S211).

In addition, the password and fingerprint merge directory provider 16a are judged with reference to the additional provider management table 193 and authentication provider management table 191 about the procedure for calling that fingerprint directory provider 18a is the additional provider and fingerprint directory provider 18a.

Progressing to step S212 following step S211, the fingerprint directory provider 18a searches the user information corresponding to the acquisition conditions specified to be the arguments of the user list acquisition function from the fingerprint DB 182, and outputs the list of the searched user information (user list) to the password and fingerprint merge directory provider 16a (S213).

FIG. 21 is a diagram for explaining an example of the user list which is acquired from the fingerprint DB.

As shown in FIG. 21, the employee ID, the fingerprint feature data, and the registration date of the fingerprint feature data etc. are contained in the searched user list for every user.

The employee ID is the information for identifying each user uniquely. That is, the user information in the external authentication server 40 and the user information in the fingerprint DB 182 can be matched by using the employee ID of each user list.

The user list searched from the fingerprint DB 182 relates to the same user as the user list searched from password directory provider 17a, when the user whose entry is done in the external authentication server 40 and the fingerprint DB 182 is the same.

However, in the external authentication server 40 and the fingerprint DB 182, it is common that the information managed is different from each other. Therefore, it means that the password and fingerprint merge directory provider 16a has acquired the information (for example, the fingerprint feature data and the fingerprint feature data are the recording date etc.) which is not acquired from the password directory provider 17a from the fingerprint directory provider 18a about the same user in step S213.

Progressing to step S214 following step S213, based on the employee ID, the password and fingerprint merge directory provider 16a distinguish each user's identity, and merges the user list acquired from the primary provider (the password directory provider 17a), and the user list acquired from the additional provider (fingerprint directory provider 18a) (the merged user list is hereafter called "merge user list").

FIG. 22 is a diagram for explaining an example of the merge user list.

In the merge user list of FIG. 22, the information acquired from the primary provider and the additional provider is merged for every user. Thus, only the two information cannot be connected in the direction of length, but the handling of the merge list can be made easy by merging for every user at the side (client 30) which has received the merge user list.

Progressing to step S215 following step S214, the password and fingerprint merge directory provider 16a outputs the merge user list to the directory service interface unit 13a, the directory service interface unit 13a will transmit the merge user information to the client 30 (S216). It means that the client 30 has acquired the merge user information.

Since the merge user information is provided in an integrated manner as the user information items managed by the separate providers independently, such as the external authentication server 40 and the fingerprint DB 182, respectively, it contains more abundant information when compared with the user information acquired from either of the separate providers.

Moreover, since the merge user information may also include the user information managed only by the external authentication server 40 and the user information managed only by the fingerprint DB 182, the client 30 can acquire the user information about a larger number of users than in the case in which the matching of the acquisition conditions is performed.

In addition, although the authentication server 10 is provided by using a general-purpose computer in the above-described embodiment, the image processing apparatus or the multi-function peripheral system which is specialized for the specific use, such as the printer, may be used as the authentication server 10.

In recent years, the image processing apparatus may have two or more applications which perform processings specific to the multi-services, such as the printer and copier, which is called the multi-function peripheral system is available. Therefore, using the multi-function peripheral system may realize the authentication server 10 in the above-described embodiment, and the same advantages of the present invention can be acquired with the multi-function peripheral system.

Figure 23:
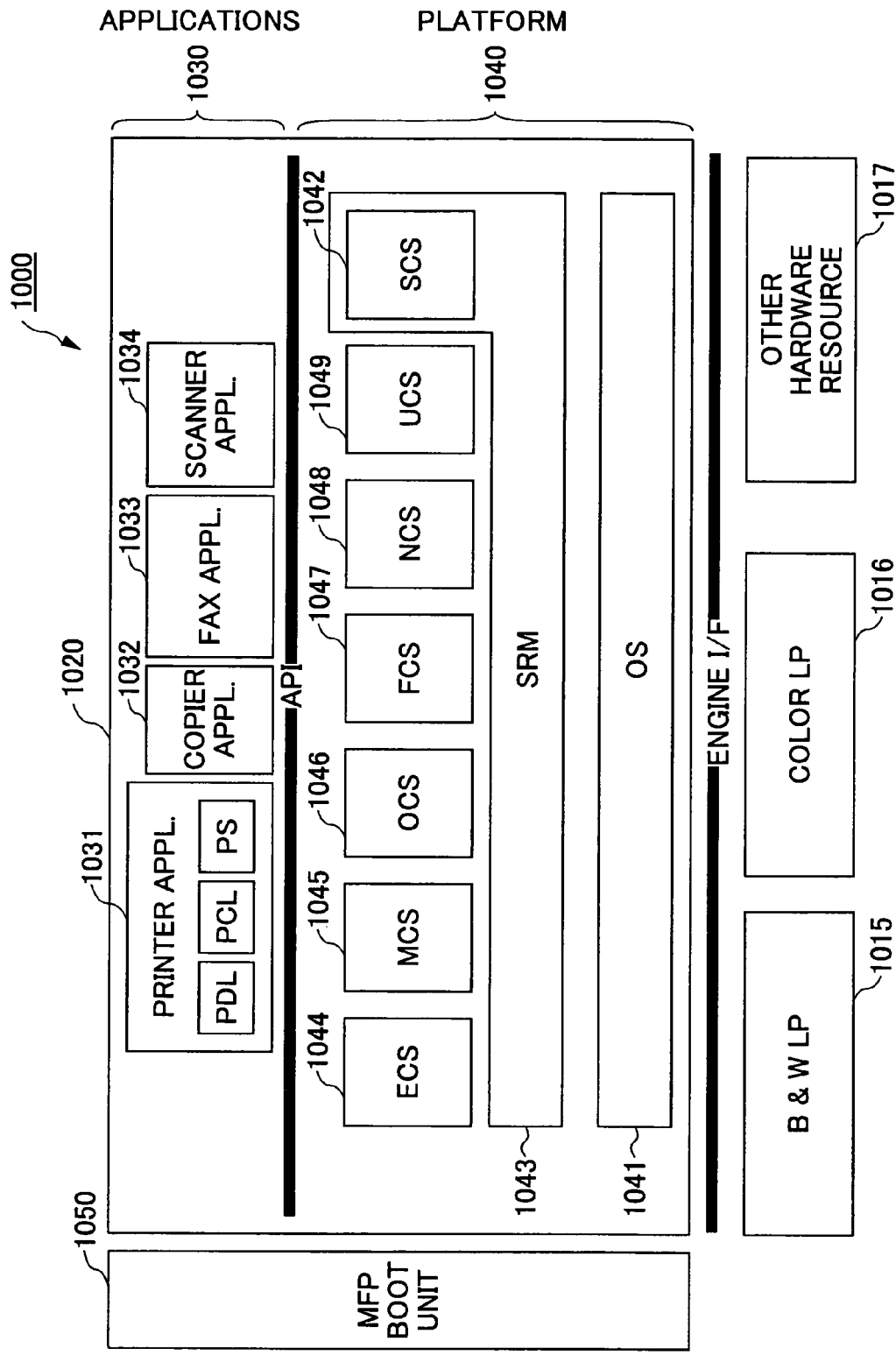
FIG. 23 is a block diagram of a multi-function peripheral system to which one embodiment of the invention is applied.

FIG. 23 is a block diagram of a multi-function peripheral system to which one embodiment of the invention is applied.

As shown in FIG. 23, the multi-function peripheral (MFP) system 1000 is constituted so that it may have the monochrome laser printer 1015, the color laser printer 1016, the hardware resources 1017, such as the scanner and facsimile, the software group 1020, and the MFP boot unit 1050.

Moreover, the software group 1020 is constituted so that it may have the applications 1030 and the platform 1040. The platform 1040 is constituted so that it may have the control service layer which interprets the processing request from the applications 1030 and creates the acquisition request of hardware resources, the system resource manager (SRM) 1043 which manages one or more hardware resources and arbitrates the acquisition request from the control service, and the operating system (OS) 1041.

The control service layer is constituted so that it may include the system control service (SCS) 1042, the engine control service (ECS) 1044, the memory control service (MCS) 1045, the operation panel control service (OCS) 1046, the facsimile control service (FCS) 1047, the network control service (NCS) 1048, and the user-information control service (UCS) 1049.

In addition, the platform 1040 is constituted with the predefined functions so that the application program interface (API) which receives the processing request from the applications 1030 is included.

The OS 1041 is the operating system, such as UNIX (registered trademark), on which parallel execution of each software of the platform 1040 and the applications 1030 is carried out as a process. The process of SRM 1043 carries out the system control and management of the hardware resources in association with SCS 1042.

For example, the process of SRM1043 arbitrates the acquisition requests from the upper layer to use the hardware resources, such as the scanner, the printer, the memory, the hard disk drive unit (HDD), and the host I/O (the Centronics interface, the network interface, the IEEE1394 interface, the RS232C interface, etc.), and carries out the execution control.

Specifically, the process of SRM 1043 determines whether the demanded hardware resources can be used according to the acquisition request (or whether they are currently used according to another acquisition request). If the use of the hardware resources is possible, the process of SRM 1043 notifies the upper layer that the demanded hardware resources can be used.

Moreover, the process of SRM 1043 performs scheduling of the hardware resources according to the acquisition request from the upper layer, and carries out directly the contents of the request, such as paper conveyance and imaging operation by means of the printer engine, memory reservation, and file creation.

The process of SCS 1042 controls the application management, the operation panel control, the system monitor displaying, the LED (light emitting diode) monitor displaying, the hardware-resource management, and the interrupted application control.

The process of ECS 1044 controls the engine units of the monochrome laser printer 1015, the color laser printer 1016, and the other hardware resources 1017.

The process of MCS 1045 performs the compression and expansion of image data, the acquisition of image memory and releasing thereof, the use of the hard disk drive unit (HDD), etc.

The process of OCS 1046 controls the operation of the operation panel used as the unit of data communication between the MFP system and the user.

The process of FCS 1047 provides the application program interface for performing the facsimile transmission and reception using the PSTN or ISDN network, the registration/retrieval of various facsimile data managed with the backup memory (backup SRAM), the facsimile reading, the facsimile reception and printing, etc.

The process of NCS 1048 provides the services which can be commonly used to the applications which need the network I/O, distributes the data of each protocol received from the network to each application, and acts as the agent module at the time of transmitting the data from application to the network.

The process of UCS 1049 manages the user information and/or the group information to which the user belong, determines another device connected through the storage device where the user information and/or the group information according to the request is stored and/or the network, acquires the user information and/or the group information to which the user belong from the determined device connected through the storage device and/or the network, and supplies the same to each application.

Alternatively, the process of UCS 1049 may be made to approve the user while managing the user information and/or the group information to which the user belong.

The above-described authentication providers (for example, the password and fingerprint merge provider, the password authentication provider, the fingerprint authentication provider, etc.) are installed in UCS 1049.

Moreover, the applications 1030 performs processing specific to the respective user services concerning the image forming processing, such as the printer, the copier, the facsimile, and the scanner. Specifically, the applications 1030 include the printer application 1031 which is the application program related the printer which is provided with the page description language (PDL, PCL) and PostScript (PS), the copier application 1032 which is the application program related to the copier, the fax application 1033 which is the application program related to the facsimile, and the scanner application 1034 which is the application program related to the scanner.

The MFP boot unit 1050 is activated by the power up of the multi-function peripheral system 1000, and starts execution of the applications 1030 and the platform 1040.

For example, the MFP bott unit 1050 reads the programs of the application layer 1030 and the platform 1040 from the flash memory or the hard disk drive, and transfers each read program to the memory storage of the SRAM or SDRAM, and starts the execution thereof.

Figure 24:
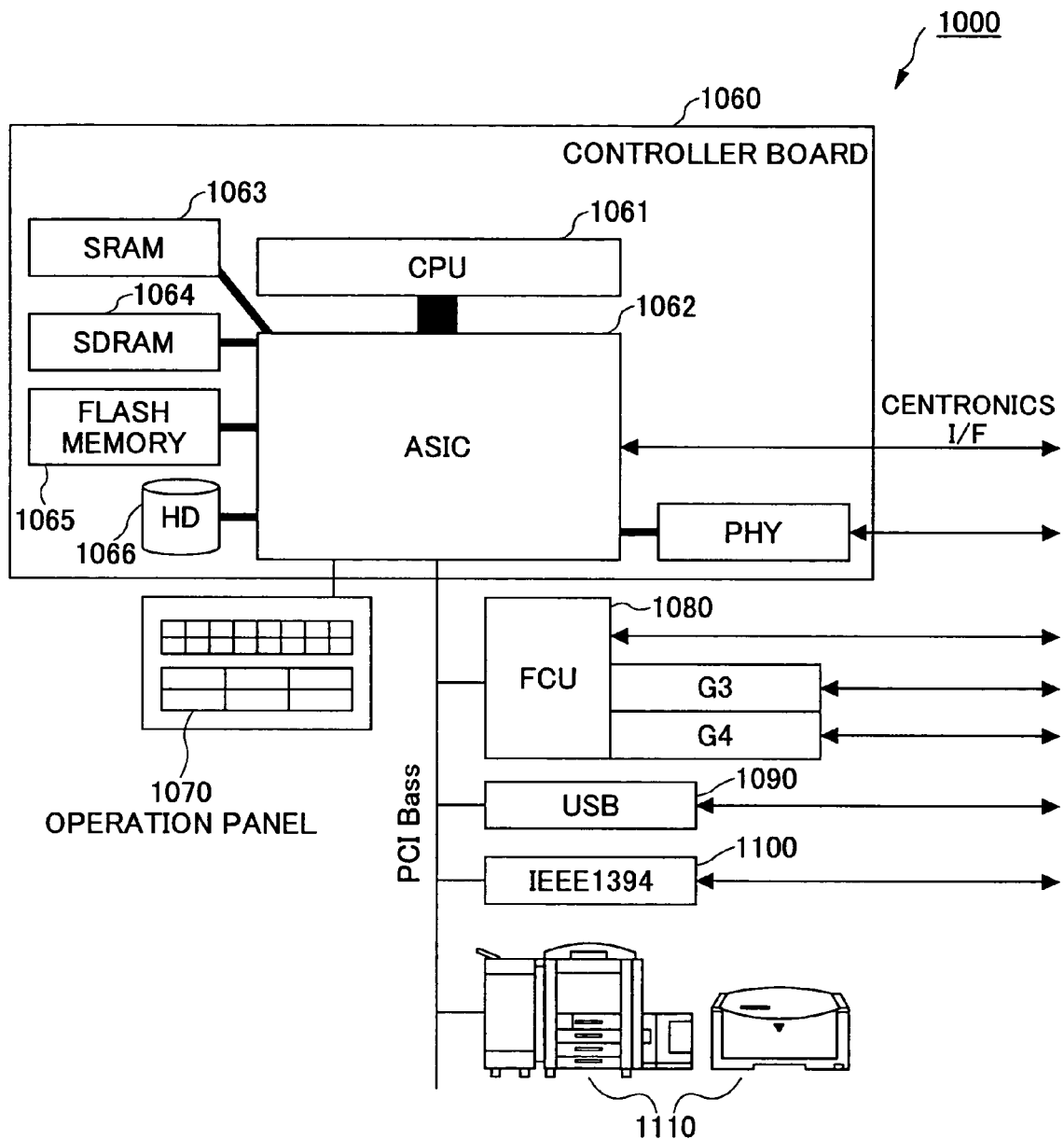
FIG. 24 is a block diagram of a hardware composition of the multi-function peripheral system.

FIG. 24 shows a hardware composition of the multi-function peripheral system to which one embodiment of the present invention is applied.

The multi-function peripheral system 1000 of FIG. 24 is constituted so that it may include the controller board 1060, the operation panel 1070, the facsimile control unit (FCU) 1080, the universal-serial-bus (USB) device 1090, the IEEE1394 device 1100, and the engine section 1110.

The operation panel 1070 is connected to the ASIC 1062 of the controller board 1060. Moreover, the FCU1080, the USB device 1090, the IEEE1394 device 1100, and the engine section 1110 are connected to the ASIC 1062 of the controller board 1060 by the PCI bus (peripheral component interconnect bus).

Moreover, the controller board 1060 is constituted so that it may include the CPU 1061, the ASIC 1062, the SRAM (static RAM) 1063, the SDRAM (synchronous DRAM) 1064, the flash memory 1065, and the HDD 1066.

The controller board 1060 is constituted so that the CPU 1061, the SRAM 1063, the SDRAM 1064, the flash memory 1065, and the HDD 1066 may be connected to the ASIC 1062.

The CPU 1061 performs control processing of the whole multi-function peripheral system 1000. The CPU 1061 starts and performs any of the printer application 1031, the copier application 1032, the fax application 1033, and the scanner-application 1034, which form the applications 1030, while it starts the execution of each of the SCS 1042, the SRM 1043, the ECS 1044, the MCS 1045, the OCS 1046, the FCS 1047, and the NCS 1048, which form the platform 1040, and performs it as a process on the OS 1041.

The ASIC 1062 is the application-specific IC for the image-processing uses which have the hardware element for the image processings. Virtual memory regions, such as the kernel and the process, are mapped by the physical memory region of the SRAM 1063 and the SDRAM 1064.

Next, a description will be given of some examples of the composition of the UCS 1049 with reference to FIG. 25 to FIG. 27.

Figure 25:
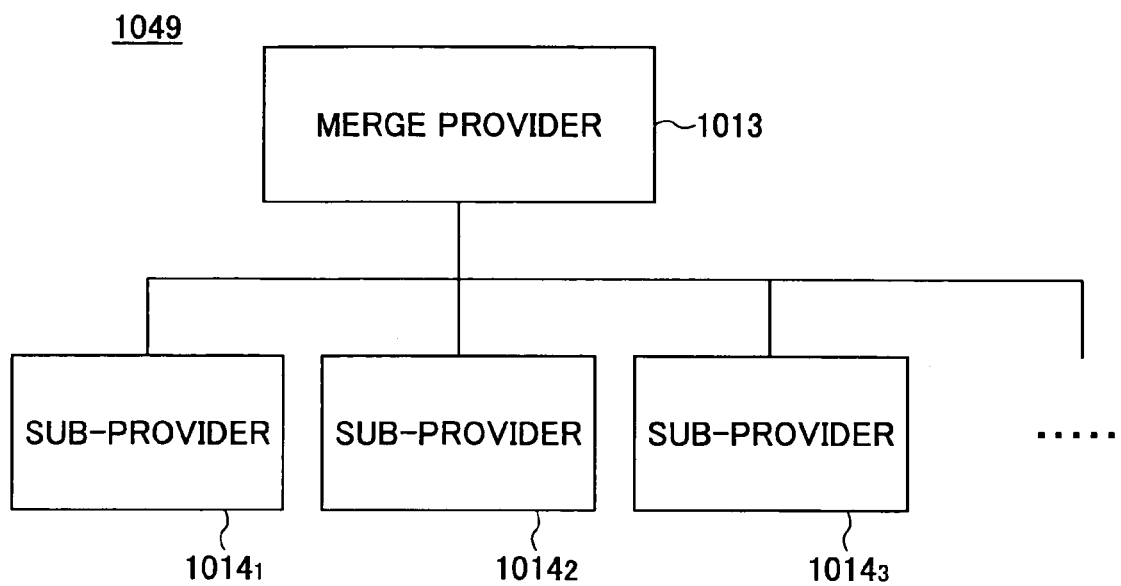
FIG. 25 is a diagram for explaining the composition of a UCS in the multi-function peripheral system.

FIG. 25 is a diagram for explaining the composition of the UCS in the multi-function peripheral system of FIG. 23. As shown in FIG. 25, the UCS 1049 includes the merge provider 1013 and a plurality of sub providers 1014.

The merge provider 1013 is provided as the merge provider, such as the password and fingerprint merge provider 16 or 16a, in the present embodiment.

The sub providers 1014 are provided as the authentication providers, which are called by the merge provider, i.e., the password authentication provider 17 and the fingerprint authentication provider 18 in the present embodiment. Therefore, one of the sub providers 1014 corresponds to the primary provider.

According to the composition shown in FIG. 25, the UCS 1049 causes the merge provider 1013 to merge the user information and the group information to which the user belong which are provided by the sub provider 1014, and provides the merged user information for the application 1030 of the multi-function peripheral system 1000.

Figure 26:
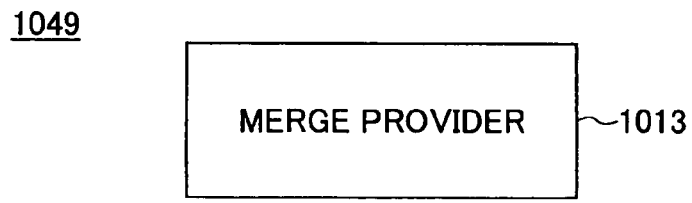
FIG. 26 is a diagram for explaining the composition of the UCS in the multi-function peripheral system.

FIG. 26 is a diagram for explaining the composition of the UCS. As shown in FIG. 26, the UCS 1049 includes only the merge provider 1013, and it includes no sub provider 1014.

According to the composition shown in FIG. 26, the merge provider 1013 merges the user information and/or the group information to which the user belong, which are provided by the sub provider 1014 installed in the other device, and provides the merged information to the application 1030 of the multi-function peripheral system 1000.

Figure 27:
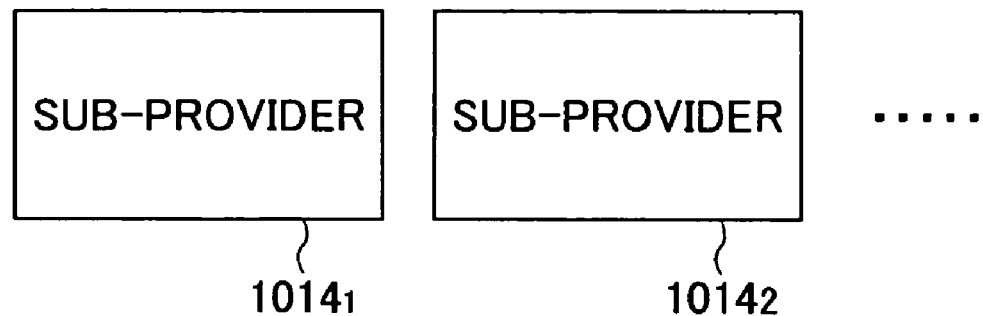
FIG. 27 is a diagram for explaining the composition of the UCS in the multi-function peripheral system.

FIG. 27 is a diagram for explaining the composition of the UCS. As shown in FIG. 27, the UCS 1049 includes one or more sub providers 1014 and includes no merge provider 1013.

According to the composition shown in FIG. 27, the user information and/or the group information to which the user belong can be provided according to the request from the merge provider 1013 installed in the other device.

The present invention is not limited to the above-described embodiments, and variations and modifications may be made without departing from the scope of the present invention.

Further, the present application is based on Japanese priority application No. 2003-078993, filed on Mar. 20, 2003, and Japanese priority application No. 2004-032085, filed on Feb. 9, 2004, the entire contents of which are hereby incorporated by reference.

What is claimed is

1. An information providing device arranged in a multi-function peripheral system including multiple image formation applications and a platform, the platform including an OS and at least one control service to control execution of a requested processing according to a function call from one of the image formation applications, the information providing device comprising:

a provider association unit configured to associate a plurality of information providers, including first and second information providers the plurality of information providers providing respective user information items, the provider association unit comprising:

a first unit causing the first information provider to receive a first user information item, stored in a first information management unit, in response to a user information receiving request;

a second unit causing the second information provider to receive a second user information item, correlated with the first user information item and stored in a second information management unit, in response to a predetermined identification data; and a third unit configured to generate an authentication merge ticket including data indicating at least one of an authentication provider name, a term of validity of the ticket, an authentication domain name, and user attributes, the authentication merge ticket being a unified information item generated by combining the first user information item and the second user information item based on the predetermined identification data; and an interface configured to transmit the authentication merge ticket to a computer remote from the information providing device via a network.

2. The information providing device according to claim 1 wherein the user information receiving request contains retrieval conditions specified therein, and the provider association unit causes the first and second information providers to respectively receive the first and second user information items that satisfy the retrieval conditions.

3. The information providing device according to claim 1 wherein the provider association unit is provided to unify the information items received by the first and second information providers for every user.

4. The information providing device according to claim 1 wherein the information providing device further comprises:
the first information provider and
the second information provider.

5. The information providing device according to claim 1 wherein the information providing device further comprises:
a first-information-provider information management unit managing a first-information-provider identification data which identifies the first information provider from among the plurality of information providers; and
a second-information-provider information management unit managing a second-information-provider identification data which identifies the second information provider from among the plurality of information providers.

6. The information providing device according to claim 1 wherein the information providing device further comprises:
a call information management unit in which a plurality of call information items used to call the plurality of information providers respectively are recorded, and
the provider association unit causes the first and second information providers to respectively receive the first and second information items by calling the first and second information providers based on the call information management unit.

7. An information providing method for use in an information providing device which makes a plurality of information providers, including first and second information providers, be associated with each other, the information providing device arranged in a multi-function peripheral system including multiple image formation applications and a platform, the platform including an OS and at least one control service to control execution of a requested processing according to a function call from one of the image formation applications, the information providing method comprising:
causing the first information provider to receive a first user information item, stored in a first information management unit, in response to a user information receiving request;
causing the second information provider to receive a second user information item when the user information receiving request exceeds a range of validity associated with the first information provider, the second user information item is correlated with the first user information item and stored in a second information management unit, in response to a predetermined identification data;
generating an authentication merge ticket including data indicating at least one of an authentication provider name, a term of validity of the ticket, an authentication domain name, and user attributes, the authentication merge ticket being a unified information item generated by combining the first user information item and the second user information item based on the predetermined identification data; and
transmitting the authentication merge ticket to a computer remote from the information providing device via a network.

8. The information providing method according to claim 7 wherein the user information receiving request contains retrieval conditions specified therein, and the first and second information providers are caused to respectively receive the first and second user information items that satisfy the retrieval conditions.

9. The information providing method according to claim 7 wherein the information items received by the first and second information providers are unified for every user.

10. A tangible storage medium including computer program instructions for causing an information providing device which makes a plurality of information providers, including first and second information providers, be associated with each other, and which is arranged in a multi-function peripheral system including multiple image formation applications and a platform, the platform including an OS and at least one control service to control execution of a requested processing according to a function call from one of the image formation applications, to perform:
causing the first information provider to receive a first user information item, stored in a first information management unit, in response to a user information receiving request;
causing the second information provider to receive a second user information item when the user information receiving request exceeds a range of validity associated with the first information provider, the second user information item is correlated with the first user information item and stored in a second information management unit, in response to a predetermined identification data;
generating an authentication merge ticket including data indicating at least one of an authentication provider name, a term of validity of the ticket, an authentication domain name, and user attributes, the authentication merge ticket being a unified information item generated by combining the first user information item and the second user information item based on the predetermined identification data; and
transmitting the authentication merge ticket to a computer remote from the information providing device via a network.

11. The tangible storage medium including computer program instructions according to claim 10 wherein the user information receiving request contains retrieval conditions specified therein, and the first and second information providers are caused to respectively receive the first and second user information items that satisfy the retrieval conditions.

12. A user authentication device arranged in a multi-function peripheral system including multiple image formation applications and a platform, the platform including an OS and at least one control service to control execution of a requested processing according to a function call from one of the image formation applications, the information providing device comprising:
a provider association unit which makes a plurality of authentication providers, including first and second authentication providers, be associated with each other, the provider association unit comprising:

a first unit causing the first authentication provider to perform, in response to a first authentication request, a first user authentication based on a first user identification data that is specified in the first authentication request;

a second unit causing the second authentication provider to perform, in response to a second authentication request related to a user approved by the first user authentication, a second user authentication based on a second user identification data that is correlated with the first user identification data; and a third unit configured to generate an authentication merge ticket including data indicating at least one of a ticket type, an authentication provider name, a term of validity of the ticket, and an authentication domain name, the authentication merge ticket being a unified information item generated by combining the first user identification data and the second user identification data based on a result of the first and second user authentication; and an interface configured to transmit the authentication merge ticket to a computer remote from the information providing device via a network.

13. The user authentication device according to claim 12 wherein the user authentication device further comprises:

the first authentication provider and
the second authentication provider.

14. The user authentication device according to claim 12 wherein the user authentication device further comprises:

a user-identification management unit in which the first user identification data and the second user identification data are correlated to each other and recorded, and the provider association unit is provided to search for the second user identification data in the user-identification management unit based on the first user identification data.

15. The user authentication device according to claim 12 wherein the provider association unit further comprises:

a user-identification management unit in which the first user identification data and the second user identification data are correlated to each other and recorded, and the provider association unit is provided to search for the second user identification data in the user-identification management unit based on the first user identification data.

16. The user authentication device according to claim 12 wherein the user authentication device further comprises:

a first-authentication-provider information management unit managing a first-authentication-provider identification data which identifies the first authentication provider from among the plurality of authentication providers; and a second-authentication-provider information management unit managing a second-authentication-provider identification data which identifies the second authentication provider from among the plurality of authentication providers.

17. The user authentication device according to claim 12 wherein the user authentication device further comprises:

a call information management unit in which a plurality of call information items used to call the plurality of authentication providers respectively are recorded, and the provider association unit causes the first and second authentication providers to perform the first and second user authentications respectively by calling the first and second authentication providers based on the call information management unit.

18. The user authentication device according to claim 12 wherein the first authentication provider creates a first electronic ticket which certifies approval of the user by the first authentication provider, the second authentication provider creates a second electronic ticket which certifies approval of the user by the second authentication provider, and the user authentication device provides information containing the first electronic ticket, in response to the first authentication request and provides information containing the second electronic ticket, in response to the second authentication request.

19. The user authentication device according to claim 18 wherein the provider association unit creates a merge ticket in which the first electronic ticket and the second electronic ticket are unified, and the user authentication device provides a first merge ticket in which the first electronic ticket is unified, in response to the first authentication request, and provides a second merge ticket in which the second electronic ticket is unified further, in response to the second authentication request.

20. The user authentication device according to claim 19 wherein the user authentication device provides the merge ticket which is encoded.

21. The user authentication device according to claim 19 wherein at least one of the merge ticket, the first electronic ticket, and the second electronic ticket contains a term of validity.

22. The user authentication device according to claim 19 wherein at least one of the merge ticket, the first electronic ticket, and the second electronic ticket contains a code for ticket falsification check.

23. The user authentication device according to claim 12 wherein the first authentication provider is a password authentication provider which performs a password authentication based on a password of the user, and the second authentication provider is a fingerprint authentication provider which performs a fingerprint authentication based on a fingerprint of the user.

24. The user authentication device according to claim 19 wherein the provider association unit causes the first authentication provider to decode the first electronic ticket of the first merge ticket in response to a decode request of the first merge ticket, and causes the second authentication provider to decode the second electronic ticket of the second merge ticket in response to a decode request of the second merge ticket.

25. The user authentication device according to claim 12 wherein the provider association unit is provided with a call function using a remote procedure call of SOAP.

26. A user authentication method for use in a user authentication device which makes a plurality of authentication providers, including first and second authentication providers, be associated with each other, the information providing device arranged in a multi-function peripheral system including multiple image formation applications and a platform, the platform including an OS and at least one control service to control execution of a requested processing according to a function call from one of the image formation applications, the user authentication method comprising:

causing the first authentication provider to perform, in response to a first authentication request, a first user authentication based on a first user identification data that is specified in the first authentication request;

causing the second authentication provider to perform, in response to a second authentication request related to a user approved by the first user authentication, a second user authentication based on a second user identification data that is correlated with the first user identification data;

generating an authentication merge ticket including data indicating at least one of a ticket type, an authentication provider name, a term of validity of the ticket, and an authentication domain name, the authentication merge ticket being a unified information item generated by combining the first user identification data and the second user identification data based on a result of the first and second user authentication; and transmitting the authentication merge ticket to a computer remote from the information providing device via a network.

27. The user authentication method according to claim 26 wherein the second user identification data is searched for in a user-identification management unit, based on the first user identification data, and, in the user-identification management unit, the first user identification data and the second user identification data are correlated to each other and recorded.

28. The user authentication method according to claim 26 wherein the first authentication provider is identified from among the plurality of authentication providers based on a first-authentication-provider identification data managed by a first-authentication-provider information management unit, and the second authentication provider is identified from among the plurality of authentication providers based on a second-authentication-provider identification data managed by a second-authentication-provider information management unit.

29. The user authentication method according to claim 26 wherein the first and second authentication providers are caused to perform the first and second user authentications respectively by calling the first and second authentication providers based on a call information management unit in which a plurality of call information items used to call the plurality of authentication providers respectively are recorded.

30. A tangible storage medium including computer program instructions for causing a user authentication device which makes a plurality of authentication providers, including first and second authentication providers, be associated with each other, and which is arranged in a multi-function peripheral system including multiple image formation applications and a platform, the platform including an OS and at least one control service to control execution of a requested processing according to a function call from one of the image formation applications, to perform:

causing the first authentication provider to perform, in response to a first authentication request, a first user authentication based on a first user identification data that is specified in the first authentication request;

causing the second authentication provider to perform, in response to a second authentication request related to a user approved by the first user authentication, a second user authentication based on a second user identification data that is correlated with the first user identification data;

generating an authentication merge ticket including data indicating at least one of a ticket type, an authentication provider name, a term of validity of the ticket, and an authentication domain name, the authentication merge ticket being a unified information item generated by combining the first user identification data and the second user identification data based on a result of the first and second user authentication; and transmitting the authentication merge ticket to a computer remote from the information providing device via a network.

31. The tangible storage medium including computer program instructions according to claim 30 wherein the second user identification data is searched for in a user-identification management unit, based on the first user identification data, and, in the user-identification management unit, the first user identification data and the second user identification data are correlated to each other and recorded.

* * * * *